(12) United States Patent  
Zafiris

(10) Patent No.: US 9,372,577 B2
(45) Date of Patent: Jun. 21, 2016

(54) METHOD AND DEVICE TO REDUCE SWIPE LATENCY

(71) Applicant: Motorola Mobility LLC, Libertyville, IL (US)

(72) Inventor: John Zafiris, Hawthorn Woods, IL (US)

(73) Assignee: Google Technology Holdings LLC, Mountain View, CA (US)

(*) Notice: Subject to any disclaimer, the term of this patent is extended or adjusted under 35 U.S.C. 154(b) by 198 days.

(21) Appl. No.: 14/186,972

(22) Filed: Feb. 21, 2014

(65) Prior Publication Data

US 2015/0242047 A1    Aug. 27, 2015

(51) Int. Cl.
*G06F 3/041* (2006.01)

(52) U.S. Cl.
CPC ............ *G06F 3/0418* (2013.01); *G06F 3/0412* (2013.01); *G06F 3/0416* (2013.01)

(58) Field of Classification Search
CPC ..... G06F 3/044; G06F 3/0418; G06F 3/0416; G06F 3/0412
USPC ...................... 178/18.01–19.07; 345/173–178
See application file for complete search history.

(56) References Cited

U.S. PATENT DOCUMENTS

| | | | |
|---|---|---|---|
| 2012/0154324 A1* | 6/2012 | Wright | G06F 3/0416 345/174 |
| 2012/0169646 A1 | 7/2012 | Berkes et al. | |
| 2012/0206380 A1* | 8/2012 | Zhao | G06F 3/04883 345/173 |
| 2013/0100071 A1* | 4/2013 | Wright | G06F 3/044 345/174 |
| 2013/0181908 A1 | 7/2013 | Santiago et al. | |
| 2014/0204036 A1* | 7/2014 | Schillings | G06F 3/04883 345/173 |

* cited by examiner

*Primary Examiner* — Michael Pervan
(74) *Attorney, Agent, or Firm* — Shumaker & Sieffert, P.A.

(57) ABSTRACT

A plurality of methods 600-800 that collectively reduces touch swipe latency within a user interface (210) of an electronic device 100/200 includes: activating 610 a predictive touch utility 120; and in response to detecting 710 a sliding movement of an external manipulator 165 from a set of prior positions on a touchpanel 148 to a current position on the surface: dynamically computing 712 a predicted next position 392 based on the set of prior positions and the current position, before the external manipulator 165 arrives at an end position 240 while continuously touching the surface; and triggering 714 advancement of 536 the user interface 210 to a predicted next frame corresponding to the predicted next position 392. Activating the predictive touch utility 120 includes selecting and loading 612 a predictive touch profile 134 having a response curve 1500/1600 that correlates to gains applied to compute the predicted next position 392.

22 Claims, 13 Drawing Sheets

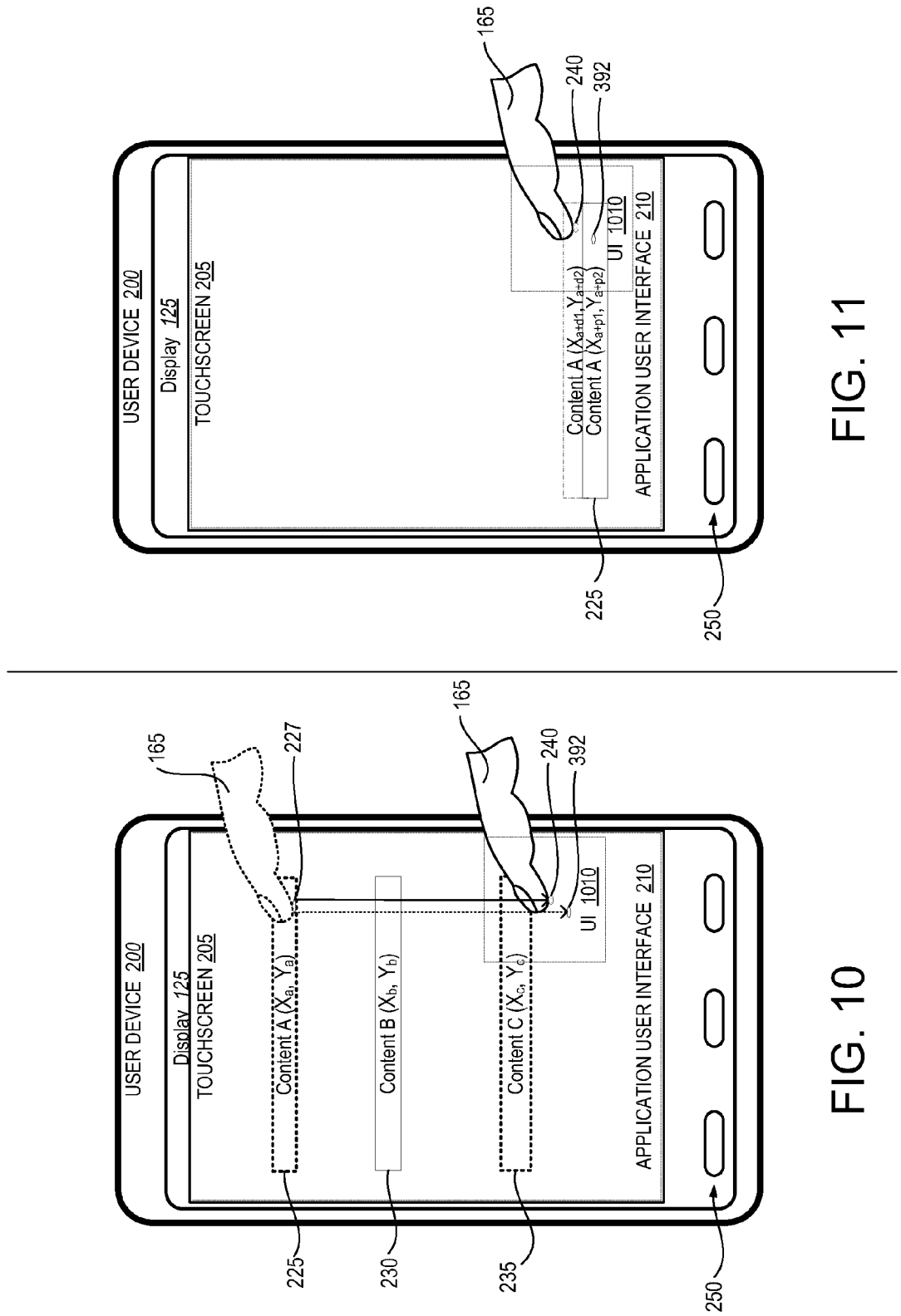

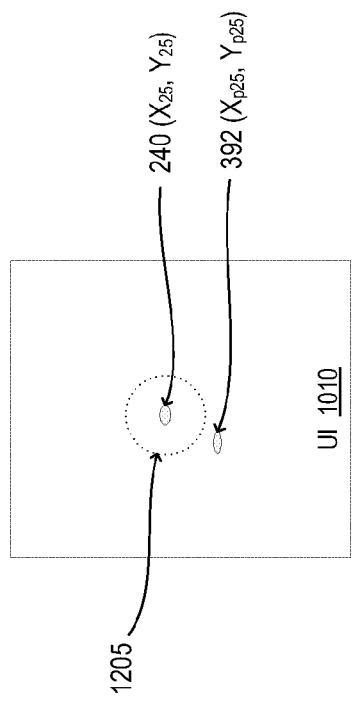
FIG. 12
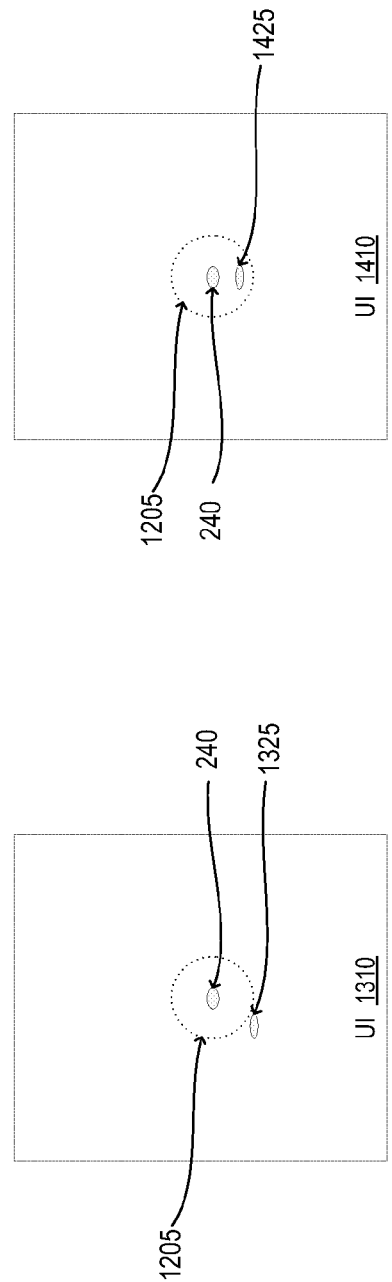
FIG. 14
FIG. 13

METHOD AND DEVICE TO REDUCE SWIPE LATENCY

BACKGROUND

1. Technical Field

The present disclosure generally relates to touch-based user interfacing with touchscreens and touchpads of electronic devices. Still more particularly, the disclosure relates to improving the responsiveness of an electronic device to a moving user touch.

2. Description of the Related Art

A large number of user electronic devices now provide touchscreens and/or touchpads that enable a user to provide tactile inputs to the device and interface with applications executing on the device. One commonly utilized tactile input is a swipe, which involves a continuous movement of the interfacing object across the touchscreen or touchpad to, among other actions, perform a corresponding scrolling response within the visible screen image of the device. The direction and velocity of the resulting scroll correlates to the direction and velocity of the moving interfacing object. Limitations in conventional applications of this technology, however, leads to swiped inputs having an inherent delay noticeable in the responsiveness of the screen image, which is often initially static and tends to lag behind the sudden, and often brisk, swiping movements of the interfacing object. Unable to respond at the speed at which a swipe occurs, conventional applications exhibit significant delays (relative to the swipe movement).

BRIEF DESCRIPTION OF THE DRAWINGS

The disclosure will best be understood by reference to the following detailed description of illustrative embodiments when read in conjunction with the accompanying drawings, wherein:

FIGS. 10 and 11 collectively illustrate an example swipe action on an electronic device where a predictive position is provided as an end result of a swipe input, in accordance with one or more embodiments;

FIGS. 12-14 illustrate an example error in a predicted end position relative to an actual end position and possible corrections thereto via an error recovery function utilizing an error threshold, according to a plurality of embodiments;

Figure 1:
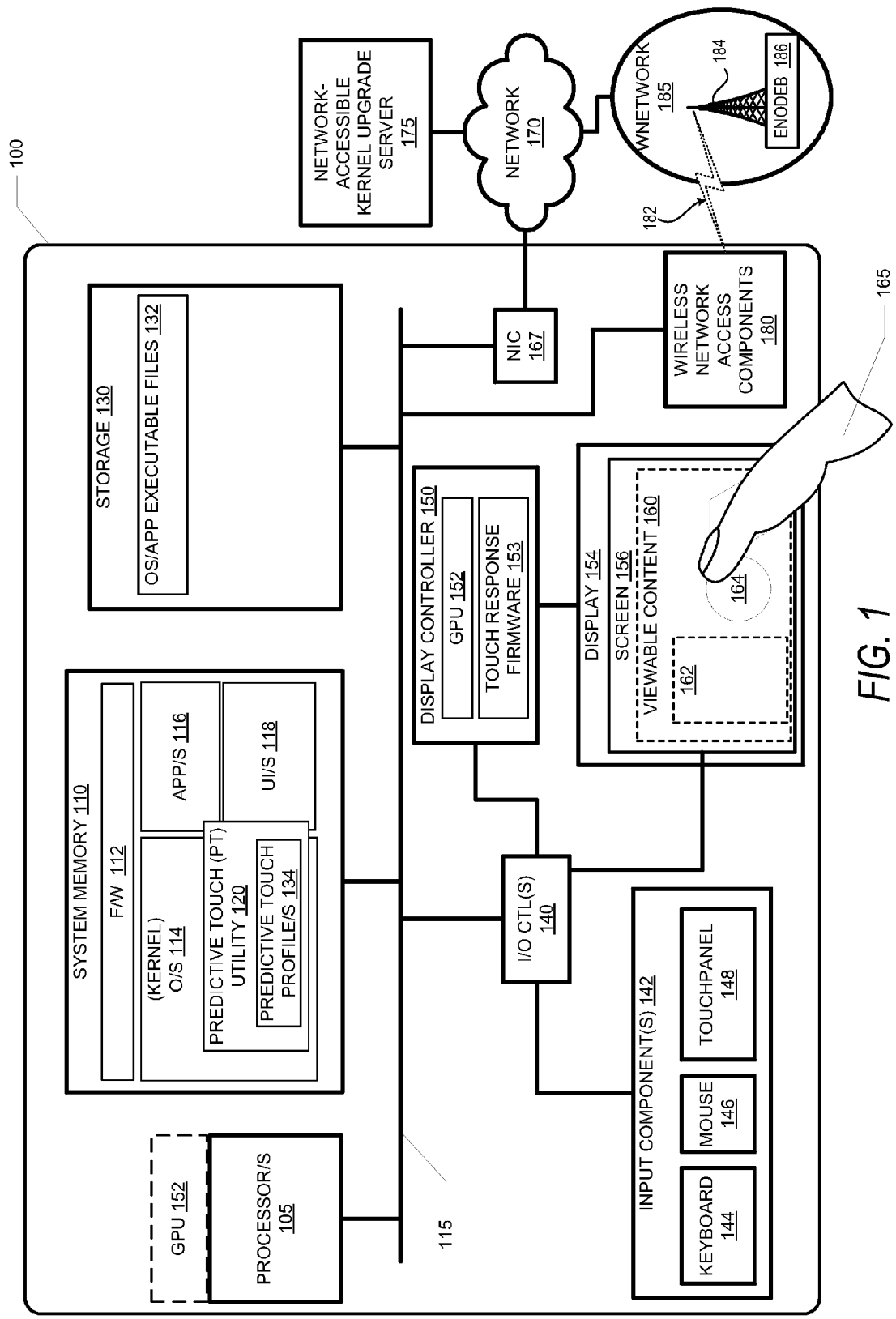
FIG. 1 is a block diagram representation of an example user electronic device configured with various functional hardware and software components that enable implementation of the predictive touch functions of the disclosure, according to one embodiment.

The description of the illustrative embodiments below can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein. Also, within the descriptions of the different figures, the use of the same reference numerals and/or symbols in different drawings indicates similar or identical items, and similar elements may have similar names and reference numerals throughout the figure(s). The specific identifiers/names and reference numerals assigned to the elements are provided solely to aid in the description and are not meant to imply any limitations (structural or functional or otherwise) on the described embodiments.

DETAILED DESCRIPTION OF ILLUSTRATIVE EMBODIMENTS

The present disclosure provides a user electronic device and a method for reducing touch swipe latency within a user interface of the electronic device. As utilized herein, the term "swipe" refers to linear and/or non-linear drag, slide, arc, and other types of touch-gesture movements. The method includes activating a predictive touch algorithm (or function) within the electronic device. In response to detecting a sliding movement of an external manipulator, such as a finger or stylus, from a set of prior positions detected by a touchpanel to a current position on the surface, the method dynamically computes a predicted next position based on the set of prior positions and the current position—while the external manipulator continues to touch the surface but before the manipulator arrives at an end position. The method results in the advancements of the user interface to a predicted next frame corresponding to the predicted next position.

The process of activating the predictive touch algorithm may include selecting and loading a predictive touch profile from among multiple available predictive touch profiles, each associated with a different response curve. The response curve correlates to a series of gains that are applied when dynamically computing the predicted next position. And, the predictive touch profile may include (1) data values associated with an overshoot recovery parameter, (2) a gain curve scaling value or an offset value, (3) a minimum number of points to evaluate before prediction is done, (4) a first number of finite impulse response (FIR) taps to use in a first of two FIR filters, or (5) a second number of FIR taps to use in the second FIR filter. The two FIR filters are utilized to determine a displacement value and a velocity value that are used when computing the predicted next position. The first and second number of FIR taps can be the same or different, in alternate embodiments. The behavior of each of the two filters is determined in part by the number of taps provided.

With reference now to the figures, FIG. 1 depicts a block diagram representation of an example electronic device 100, within which one or more of the described features of the various embodiments of the disclosure can be implemented. As will become clear by the description which follows, the functionality described by the disclosure can be applicable to a large number of different electronic devices, such as, but not limited to, a desktop computer, a laptop computer, a tablet computer, a mobile phone, a smart phone, a personal digital assistant (PDA), gaming systems, media players, and others. The electronic devices within which the various functional aspects of the disclosure can be implemented are devices that (a) include or are capable of being connected to a display for outputting graphical or visual content on a screen, (b) include an operating system construct that supports both displaying of graphical user interfaces and manipulation of displayed screen images by entry of tactile inputs on one of a touchscreen or touchpad that is included within or communicatively coupled to the electronic device 100, (c) include one or more software applications that generate the screen images that can be manipulated by tactile input, and (d) include one or more processors and other hardware components to support the execution and processing of the functional software components described in the disclosure. In the illustrated embodiments, the tactile input components include a touch panel, which can be implemented in a touchscreen and/or a touchpad; however, the functionality described is applicable to other forms of tactile input devices that can support a swipe operation. FIG. 1 illustrates several other functional components of electronic device 100, which are described below.

Electronic device 100 includes one or more processor/s 105 coupled to system interconnect 115. System interconnect 115 can be interchangeably referred to as a system bus. Also coupled to system interconnect 115 is system memory 110 and persistent storage 130, each of which can have an associated controller (not shown). Illustrated within storage 130 are additional modules, including executable files 132 for both the operating system (O/S) 114 and software application(s) 116. These files 132 include code for generating the user interfaces 118 provided as or within the viewable screen 156. Following device power-on and during device operation, software and/or firmware modules maintained within persistent storage 130 can be loaded into system memory 110 for execution by processor/s 105. As shown, system memory 110 can include a number of software and/or firmware modules, including firmware (F/W) 112, operating system (O/S) 114, and application/s 116. O/S 114 can also be interchangeably referred to as a kernel. During execution by processor/s 105, O/S 114 and application/s 116 generate user interfaces (UI/s) 118, which can be displayed as/within a viewable screen 156 on a connected display 154.

In addition to the aforementioned firmware and software, and according to one or more embodiments, system memory 110 can include one or more additional modules that collectively enable the performance of various aspects of this disclosure. For simplicity, these modules are collectively represented with predictive touch (PT) utility 120. A more detailed breakdown of the functional components and data parameters within PT utility 120, such as predictive touch profile/s 134, is provided in FIG. 3. As illustrated, PT utility 120 can be provided as a module within the O/S kernel 114 and thus made integral to the operation of the electronic device 100. Alternatively or additionally, PT utility 120 can be provided as user space application running in layers above the kernel.

Electronic device 100 further includes one or more input/output (I/O) controller(s) 140 which support connection by, and processing of signals from, one or more connected input component/s 142, such as a keyboard 144, mouse 146, or tactile component/s, including touchpanel 148 possibly implemented as a touchpad or touchscreen. I/O controller/s 140 also support connection to and forwarding of output signals to one or more connected output components, such as a monitor or display 154. Access to display 154 is controlled by display controller 150, which can include a graphical processing unit (GPU) 152 and touch response firmware 153. In one or more embodiments, display controller 150 can be a graphics card, with GPU 152 located thereon, executing touch response firmware 153. However, as further illustrated, in at least one embodiment, GPU 152 can optionally be integrated onto a processor chip or block that includes processor/s 105. Functionality of GPU 152 germane to the disclosure will be described later.

Display 154 can be any kind of display, including but not limited to, liquid crystal display (LCD), organic light emitting display (OLED), light emitting display (LED), and electrophoretic ink (e-ink) to name a few. It is appreciated that the display 154 described within the various embodiments can be a display configured for use as a display peripheral requiring a cable or other form of connection to a separate electronic device that generates or provides the image/screen data for presentation on the display 154. Alternatively, the display device can also be an integral part of the actual electronic device, such as an LCD screen utilized with tablet computers, smartphones, and "all in one" integrated personal computing systems. Viewable screen 156 is presented on display 154 and includes viewable content 160, which can include different elements 162, 164, such as virtual buttons, virtual keypads, icons, images, and text. As shown, viewable screen 156 is described as a touchscreen, although aspects of the disclosure can be implemented with a regular screen that is not a touchscreen, in alternate embodiments. For consistency, references to viewable screen 156 shall include both touchscreens and standard screens that do not support touch input detection, while references to touchscreen shall be assumed to refer to a touchscreen only. Aspects of the disclosure are described from the perspective of manipulation of a viewable screen 156 and specifically viewable elements 162, 164 within viewable screen 156 via tactile input by an external manipulator 165 as detected by a touchpanel 148. The external manipulator 165 is usually implemented by a user's finger or stylus.

Electronic device 100 further has a network interface component (NIC) 167. NIC 167 enables electronic device 100 to communicate and/or interface with other devices, services, and components that are located external to electronic device 100. These devices, services, and components can interface with electronic device 100 via an external network, such as example network 170, using one or more communication protocols. Network 170 can be a local area network, wide area network, personal area network, and the like. For purposes of discussion, network 170 is indicated as a single collective component for simplicity. However, it is appreciated that network 170 can include one or more direct connections to other devices as well as a more complex set of interconnections as can exist within a wide area network, such as the Internet.

Among the devices that are accessible via network 170 can be network-accessible kernel upgrade server 175, which can provide firmware upgrades, such as the addition of PT utility 120, to enhance the touch input responsiveness of the O/S 114 within electronic device 100. Thus, in one embodiment, PT utility 120 can be downloaded to electronic device 100 as an application or utility from network-accessible kernel upgrade server 175.

Additionally or alternatively to the physical connection to network 170 via NIC 167, electronic device 100 can also include wireless network access components 180 which enable electronic device 100 to communicate with a wireless network 185 via a wireless (i.e., over-the-air) medium 182. Wireless network 185 can include one or more base stations, such as evolved node B (eNodeB) 186 with associated antenna 184. Alternate wireless networks can include one or more access points such as a WLAN access point, a Bluetooth transceiver, an infrared transceiver, a NFC transceiver, and the like. As further shown, wireless network 185 can be connected to network 170 to enable access to the one or more other devices that are accessible via network 170. It is appreciated that for implementations in which electronic device 100 is a wireless communication device, such as a mobile phone, many of the physical components of electronic device 100 can be different or differently configured, with components such as NIC 167 not present or supported.

Figure 2:
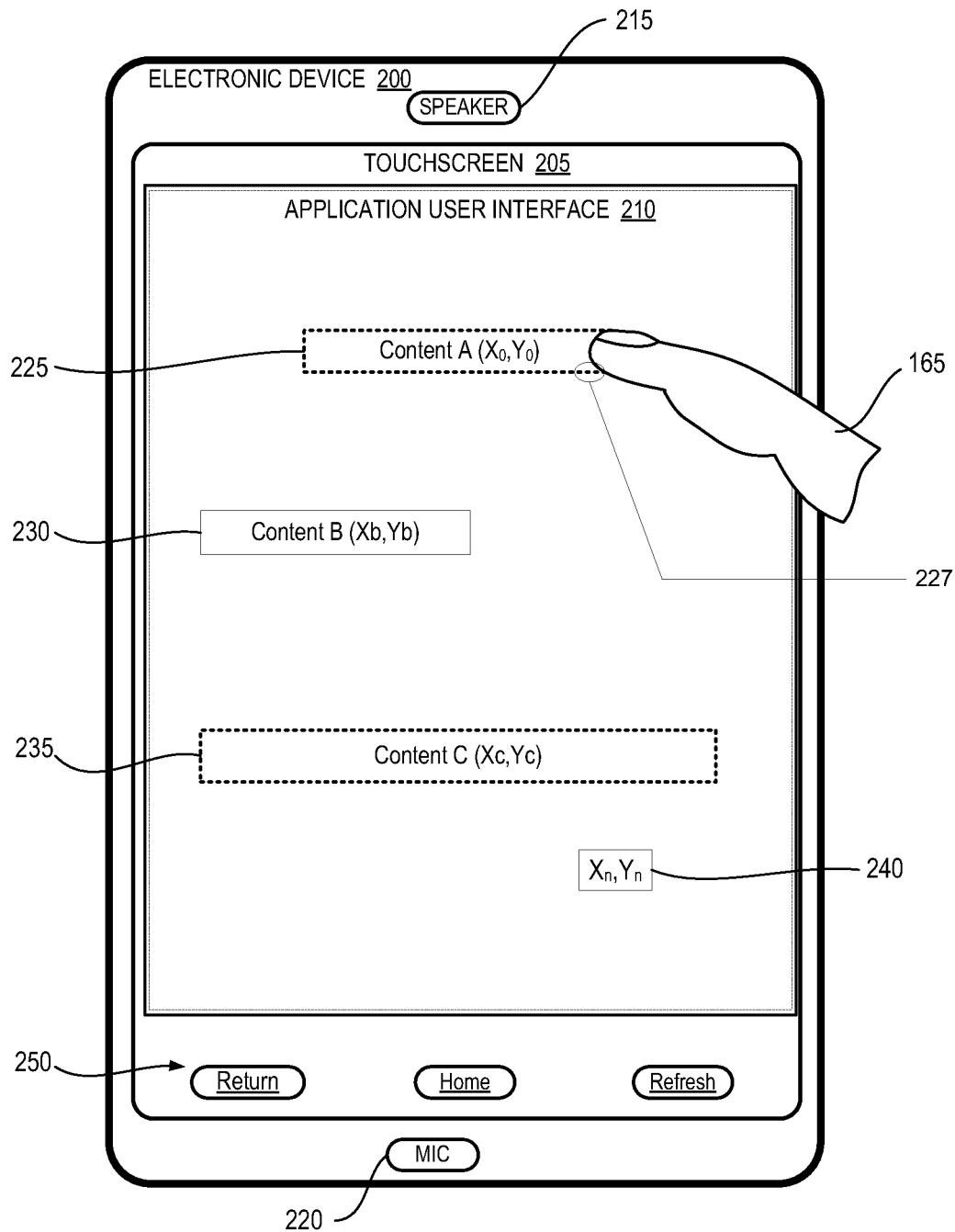
FIG. 2 illustrates another example of a user electronic device configured as a smart phone with touchpanel input capability and which supports predictive touch capabilities, according to one or more embodiments.

FIG. 2 illustrates a second example user electronic device 200, which is configured as a wireless/cellular/mobile phone, and is hereafter referred to as a mobile electronic device 200. Mobile electronic device 200 can include similar hardware components as electronic device 100. For example, mobile electronic device 200 can include a processor, memory, internal storage, wireless network access components (e.g., transceivers), and the like. To support wireless voice communication, mobile electronic device 200 includes speaker 215 and microphone (mic) 220. However, more focus shall be given to the user interface components and functions as related to a touchscreen interface.

Mobile electronic device 200 includes touchscreen 205 incorporating touchpanel 148 (FIG. 1). A display panel of touchscreen 205 presents multiple different content elements, which are each indicated along with their respective X-Y screen location on a 2-dimensional X-Y plane. In this example an application's touchscreen user interface 210 has four content elements. Among the content elements are content A 225, with screen location $X_0, Y_0$ 227, content B 230 with screen location Xb,Yb, and content C 235, with screen location Xc,Yc.

Additionally, another location, $X_n, Y_n$ 240 is identified. In this example, the location $X_n, Y_n$ 240 does not correspond to displayed content, although it could. To interface with specific content displayed on touchscreen 205, a user provides an external manipulator 165, represented by a finger. The external manipulator 165 can be another object that is not specifically a part of a human body, including inanimate objects such as a stylus. In the illustration of mobile electronic device 200, external manipulator 165 is detected at position $X_0, Y_0$ 227 and over content A 225 on touchscreen 205, and external manipulator 165 can be moved in a continuous motion, without leaving the surface of the screen, to another X-Y position on an application's touchscreen user interface 210, such as $X_n, Y_n$ 240 and then leave the surface at $X_n, Y_n$. This continuous movement of external manipulator 165 across the surface of the display screen is referred to herein as a swipe. The path of the swipe may be linear, non-linear, direct (e.g., from $X_0, Y_0$ directly toward $X_n, Y_n$), or indirect (e.g., from $X_0, Y_0$, then to the right, then down, and then to the left to end at $X_n, Y_n$), and the path of the swipe may have any number of average or instantaneous velocities.

In addition to selectable content elements on an application's touchscreen user interface 210, touchscreen 205 can also provide other selectable options 250 that require tactile selection. As shown, these selectable options 250 can include general navigation options (i.e., return, home, refresh, etc.).

Figure 3A:
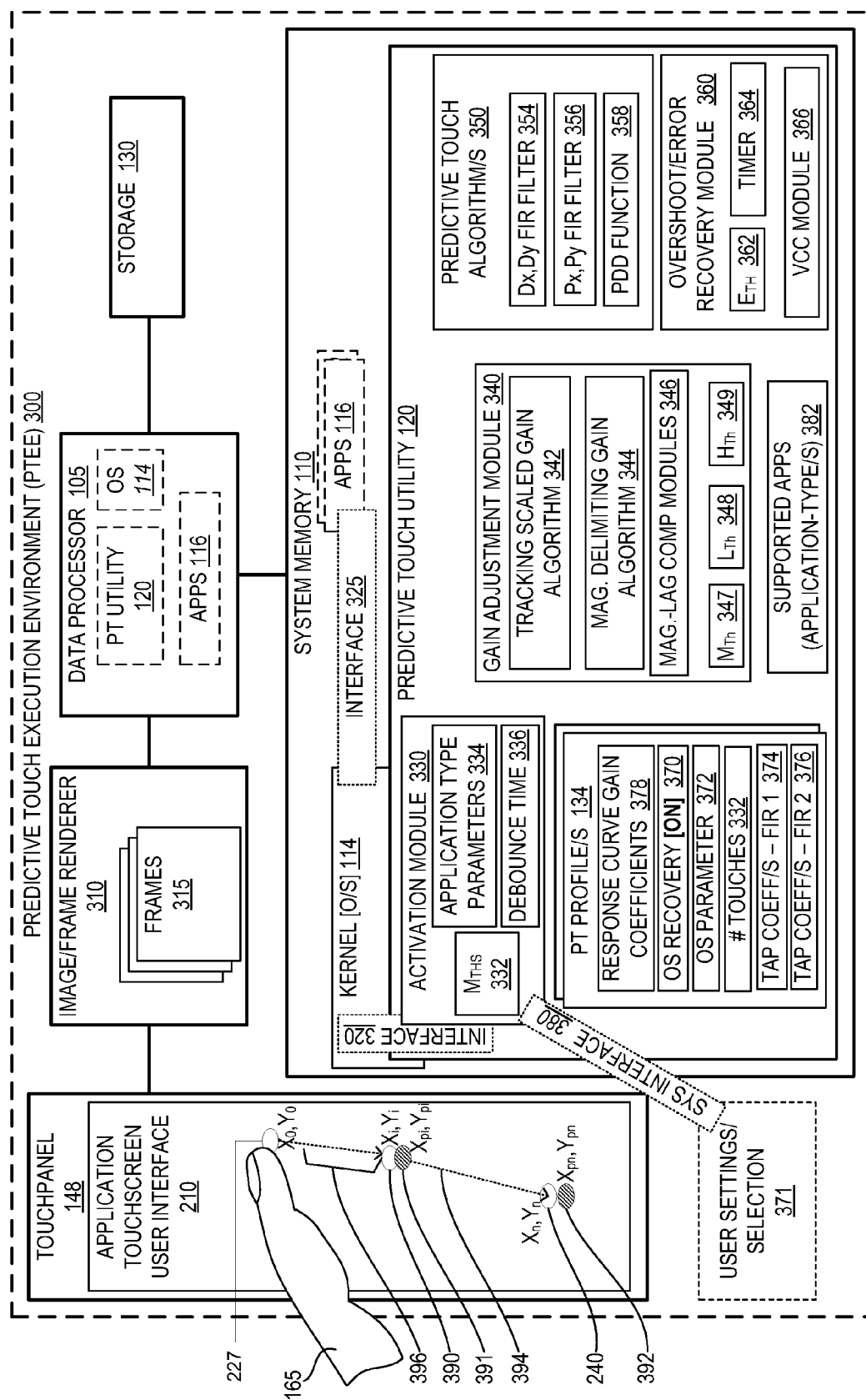
FIG. 3A is a block diagram representation of functional modules within a predictive touch operating environment, in accordance with one or more embodiment.

FIG. 3A illustrates an example predictive touch execution environment (PTEE) 300, which is presented using several of the physical and/or functional hardware and software components of FIGS. 1 and 2. The description of PTEE 300 thus includes references to components of FIGS. 1 and 2, with overlapping components having the same reference numeral. PTEE 300 includes touchpanel 148, which can be implemented via touchscreen 205, touchpad, or similar component. It is further appreciated that touchpanel 148 can also include firmware and other physical components that support the conversion of the received touch inputs into corresponding visual representations on the viewable screen. Touchpanel 148 is shown having application touchscreen user interface 210 within which particular screen coordinates are shown.

Within FIG. 3A and other figures, to allow for greater visibility of the detected and predicted touch positions, the screen positions are magnified and illustrated as circular points, rather than dots on the screen. Screen position $X_0, Y_0$ 227 represents a first, starting position from which a swipe by external manipulator 165 is detected. Second screen position $X_n, Y_n$ 240 represents the actual end position of external manipulator 165 when the swipe (illustrated by dotted lines from $X_0, Y_0$ 227 to $X_n, Y_n$ 240) is complete. Also shown is predicted end position $X_{pn}, Y_{pn}$ 392. These positions 227, 240 will be utilized throughout the description to represent the start and end points/positions of a swipe input by the external manipulator 165. Additionally, a series of intermediate positions, of which $X_i, Y_i$ 390 is illustrated, are touched as external manipulator 165 is swiped from $X_0, Y_0$ 227 to $X_n, Y_n$ 240.

Figure 3B:
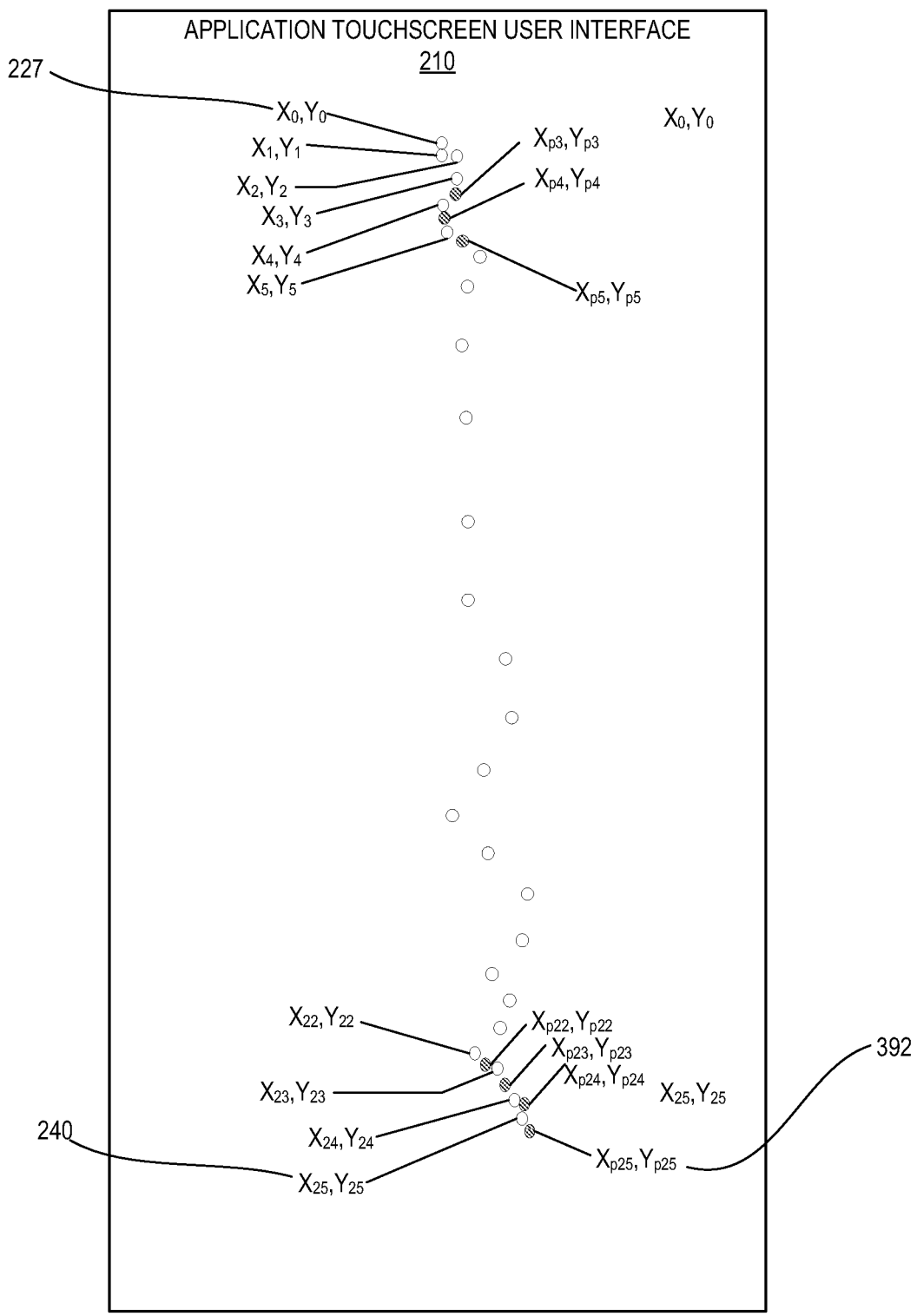
FIG. 3B illustrates an example sequence of swipe positions on an application user interface and corresponding predicted end positions, in accordance with one embodiment.

FIG. 3B provides a more detailed view of an example series of touch positions on application touchscreen user interface 210 and resulting predicted end positions generated by execution of the predictive touch functionality of the disclosure. The series of touch positions are numbered with X-Y coordinates beginning with $X_0, Y_0$ 227 and ending with $X_{25}, Y_{25}$, which represents $X_n, Y_n$ 240 for n=25. A number of predicted end positions are also illustrated. In one or more embodiments, the predictive touch functionality is implemented following receipt of a minimum number of initial touch inputs, M. The value M is equivalent to a predetermined number of touch inputs ($N_{TS}$), which will be explained later in conjunction with FIG. 4. In the specific example of FIG. 3B, M is equal to 3, such that a minimum of three recorded previous touch inputs are required to trigger the predictive touch functionality and are utilized in evaluating the predicted end position $X_{pn}, Y_{pn}$ 392. Two example predicted end positions, which are shown as predicted end positions $X_{p5}, Y_{p5}$ and $X_{p25}, Y_{p25}$, will be computed using sets of prior positions to improve the responsiveness of the display to the swipe.

Returning to FIG. 3A, PTEE 300 includes image/frame renderer 310, which graphically presents image data as frames 315 that are displayed on user interface 210. Image/frame renderer 310 can include or be a component of GPU 152 (FIG. 1). Image/frame renderer 310 is coupled to or can be embedded within a display device, in an alternate embodiment. Image/frame renderer 310 is also coupled to data processor 105. Data processor 105 executes software associated with O/S 114, application(s) 116, and PT utility 120. The software code and/or modules of these associated programs are located within system memory 110 and/or storage 130 which are communicatively coupled to processor 105. Thus, system memory 110 includes O/S (or kernel) 114, application/s 116, and PT utility 120. It is appreciated that at least a part of, and possibly all of, the PT utility 120 can be provided as a module within the kernel (OS 114), in one or more embodiments.

Each of these software modules provides one or more features that collectively enable the predictive touch functionality within PTEE 300. A first interface 320 associates the OS-level PT features of OS 114 with activation module 330 of PT utility 120. Similarly, second interface 325 associates application-level PT settings and parameters with PT utility 120 via O/S 114, and third system interface 380 associates user-level settings and selection 371 with PT utility 120. These interfaces 320, 325, 380 generally represent one or more function calls and/or sub-routines that (i) enable the functionality of PT utility 120 to be made accessible to executing applications via enhancements to the O/S 114 and (ii) enable application-based setting or user setting of one or more activation parameters of PT utility 120. As one example, user selection of a specific predictive touch profile from among the multiple available predictive touch profiles can be configured as one option available within PTEE 300. Accordingly, a user can select a profile having a fast response curve or a profile having a slower response curve, among others. With the application-based setting, an application can be programmed to turn off predictive touch functionality or to select a specific predictive touch profile based on some programmed criteria. Thus, in one embodiment, the predictive touch utility 120 includes a system interface 380 that enables user space entry of inputs that set or select features of the predictive touch utility 120 based on a profile setup, including a first function call to set a level of responsiveness of the prediction by selecting the appropriate predictive touch profile and a second function call to turn the predictive touch function off for the device and/or the active application.

Primary functional components or modules of PT utility 120 include activation module 330, gain adjustment module 340, predictive touch algorithm/s 350, and overshoot and/or error recovery (OER) module 360. Activation module 330 includes number of touch inputs ($M_{TH}$) parameter 332, which provides the total number of touch inputs that must be first recorded before predictive touch features are activated. Activation module 330 also includes application type parameters 334, which indicates which different types of applications are or can be configured to support predictive touch functionality. Also included within activation module 330 is timer 336, which is used to track a debounce time that generally represents the minimum amount of time that a stable touch signal of a single external manipulator 165 (rather than multiple external manipulators) has to be recorded before the predictive touch functionality can be enabled. Finally, activation module 330 also includes the necessary interfaces of system calls to select one of multiple predictive touch profile/s 134.

According to the illustrative embodiment, the predictive touch utility 120 includes an activation module 330 that determines when to activate predictive touch functionality during the execution of an active application (116). The activation module 330 configures the electronic device 100/200 to: (1) identify which application (116) is generating the first user interface 210 being actively displayed on the user device 100/200; (2) trigger the activation of the predictive touch functionality when the application generating the active user interface 210 is at least one of: (i) a first-type application whose user interface 210 is compatible with the predictive touch functionality; (ii) an application within a pre-established list of supported applications 382 for which the predictive touch functionality is pre-assigned; or (iii) an application pre-programmed to instantiate the predictive touch algorithm by modifying one or more parameters of a virtual file within a kernel (114) of the electronic device 100/200; and (3) disable the predictive touch functionality when the application generating the active user interface is a second-type application whose user interface is not compatible with the predictive touch algorithm.

Within the illustrative embodiment, predictive touch profile/s 134 are located within PT utility 120 in system memory 110, or in storage 130 with at least one being loaded to system memory 110 during operation. Specifically, the predictive touch profile/s 134 can be static arrays built into the predictive touch utility 120. In the illustrative embodiment, predictive touch profile/s 134 includes a set of data components. One data component can be overshoot (OS) recovery setting 370, which can be set to "on" or "off", in one embodiment. In the present example, OS recovery setting 370 is set to "on". Predictive touch profile/s 134 may also include overshoot range parameter 372, which in one embodiment is a maximum error range that is acceptable before OS recovery is triggered, assuming that OS recovery setting 370 is set to "on". Thus for example, if a predicted second position is within 2 error units (e.g., 1 cm) of the actual second position of the external manipulator 165, no overshoot recovery is triggered; however, overshoot recovery is automatically triggered when the predicted position falls outside of the 2 error units. Predictive touch profile/s 134 may further provide the number of detected touch positions 332 required to trigger the activation of the predictive touch features within the executing application. Additionally, predictive touch profile/s 134 may include a first set of tap coefficients 374 for first FIR filter 354 and a second set of tap coefficients 376 for second FIR filter 356. Also included within each predictive touch profile 134 is a response curve and/or a set of response curve gain coefficients 378. The response curves are generally illustrated within predictive touch profile/s 134 by their specific set of response curve gain coefficients 378, and these data points can be plotted on an X-Y access to generate the corresponding response curves. Examples of response curves and data points are illustrated by FIGS. 6 and 7, which will be described in conjunction with FIG. 5.

As shown, the predictive touch utility 120 also includes a gain adjustment module 340. Gain adjustment module 340 includes tracking scaled gain algorithm 342, magnitude delimiting gain algorithm 344, and magnitude and lag calculation/computation modules 346. Gain adjustment module 340 further includes several data parameters or threshold values, indicated as $M_{Th}$ 347, $L_{Th}$ 348, and $H_{Th}$ 349. These threshold values can be provided as additional data points within a specific predictive touch profile, in one or more embodiments. Actual use of these values during the computation of predicted positions is described later with reference to FIG. 4.

The gain adjustment module 340 configures the processor 105 to: in response to the first displacement magnitude $M_{Th}$ 347 not being greater than the low displacement threshold $L_{Th}$ 348, determine whether a second displacement magnitude between a most-recent prior predicted next position and the current position is greater than a high displacement threshold $H_{Th}$ 349. Then, in response to the second displacement magnitude $M_{Th}$ 347 being greater than the high displacement threshold $H_{Th}$ 349: determine whether the most-recent prior predicted next position lags behind the current position; and when the most-recent prior predicted next position does not lag behind the current position, implement the magnitude delimiting gain algorithm 344 which dynamically lowers a magnitude of the amount of gain. The dynamic computation of the predicted next position uses a result of the magnitude delimiting gain algorithm 344 to generate the predicted next position.

Additionally, the gain adjustment module 340 further configures the processor 105 to: in response to one of (a) the second displacement magnitude being less than the high displacement threshold and (b) the most-recent prior predicted next position lagging behind the current position, implement a scaled gain algorithm 342 to generate a result that is utilized to dynamically compute the predicted next position.

Predictive touch algorithms 350 of PT utility 120 include displacement (Dx,Dy) finite impulse response (FIR) filter 354, which is also referred to herein as first FIR filter 354, and predictive displacement (Px,Py) FIR filter 356, which is also referred to herein as second FIR filter 356. Predictive touch algorithm/s 350 also include predicted displacement determining (PDD) function 358. The various features provided by these components of PT algorithms 350 are described with reference to FIG. 4.

In the illustrative embodiments, the predictive touch algorithm/s 350 configure components of the electronic device 100/200 to: in response to the number of prior positions being at least the threshold number M of prior positions, determine whether a first displacement magnitude between a most-recent prior position and the current position is greater than a low displacement threshold. In response to the first displacement magnitude being greater than the low displacement threshold, the predictive touch algorithm/s 350 dynamically computes the predicted next position by configuring components of the electronic device 100/200 to: generate a displacement value from the set of M prior positions and the current position using a first finite impulse response (FIR) filter 354 having weighted tap coefficients; provide the displacement value and a set of response curve gain coefficients 378 corresponding to the selected predictive touch profile as inputs to a predicted displacement determining (PDD) function to generate a predicted displacement; and compute the predicted next position of the external manipulator 165 based on the predicted displacement. According to one or more embodiment, the response curve gain coefficients 378 are weighted with varying weights based on the depth of the filter, and the number of taps utilized within the filter can be a design choice linked to the selected predictive touch profile.

Overshoot recovery module 360 includes error threshold value $E_{TH}$ 362, timer 364, and virtual coordinate computation (VCC) module 366. Usage of these components will be described with reference to FIG. 4.

Collectively, the above described components and features of FIGS. 1-3B provide an electronic device 100/200 including: (1) a screen 156 displaying at least an application touchscreen user interface 210 that is generated using a plurality of image frames 315; (2) a touchpanel 148 that detects touch inputs from an external object (manipulator 165) and transmits position data (e.g., 227, 390, 240) of the touch inputs to a frame rendering component 310 that presents the touch inputs as input events within the application's touchscreen user interface 210; and (3) a processor 105. The electronic device 100/200 also includes (4) a predictive touch utility 120 that executes on the processor 105 and configures the electronic device 100/200 to: in response to detecting a sliding movement of the external object 165 from a set of prior positions 396 (e.g., $X_{i-m}, Y_{i-m}$, where m is a pre-established number of prior touch positions required for implementing predictive touch) on the touchpanel 148 to a current position (e.g., $X_i, Y_i$ 390) on the surface, dynamically compute a predicted next position (e.g., $X_{pi}, Y_{pi}$ 391) based on at least the set of prior positions 396 and the current position 390, before the external manipulator 165 arrives at an end position (e.g., $X_n, Y_n$ 240); and results in (or triggers) the advancement of the user interface 210 to a predicted next frame (among frames 315) corresponding to, and anticipating the predicted next position $X_{pn}, Y_{pn}$ 392.

The electronic device 100/200 has an operating system 114 that includes: the frame rendering component 310 to visually present active frames of the first user interface 210; and an application interface 325, including a function call, that supports communication of predictive touch results among the predictive touch utility 120, one or more application touchscreen user interfaces 210, and the frame rendering component 310, including communication of application settings for the predictive touch utility 120. The electronic device 100/200 also has an application that executes on the processor 105 to generate the first user interface 210 and which interfaces with the operating system 114 via the application interface 325.

The electronic device 100/200 also includes a storage component 130 having a plurality of predictive touch profiles 134 stored therein, each profile (134) associated with a different response curve (378) that correlates to a series of gains that are applied to detected touch positions when dynamically computing the predicted next position of a swipe. And, the predictive touch utility 120 further configures the processor 105 to: select and load a predictive touch profile from among the plurality of available predictive touch profiles 134.

In the described embodiments, the predictive touch utility 120 configures components of the device to select and load a predictive touch profile from among multiple available predictive touch profile/s 134, each associated with a different response curve (378) that correlates to a series of gains that are applied when dynamically computing the predicted next position, and the predictive touch profile/s 134 includes data values associated with an overshoot recovery parameter 372, and at least one of gain curve scaling and offset, a minimum number of points (number of touches 332) to evaluate before prediction is done, and two sets of finite impulse response (FIR) taps 374, 376 to use in two FIR filters 354, 356 that are respectively utilized to determine a displacement and a velocity value that are utilized in computing the predicted next position. Also, each predictive touch profile (134) has a corresponding overshoot recovery setting 370 that is set to one of "on" and "off". And, the predictive touch utility 120 further includes an overshoot/error recovery module 360 that configures the processor 105 to: in response to the selected predictive touch profile 134 having the overshoot recovery setting 370 set to "on": evaluate whether the predicted next position falls within a pre-set error threshold of the current position; in response to the current position falling outside of the pre-set error threshold, initiating a recovery function (via VCC module 366) that adds at least one virtual position as a virtual current position until a resulting virtual predicted next position falls within the pre-set error threshold $E_{TH}$ 362. The error recovery module 360 further configures the processor 105 to: in response to the current position falling within the pre-set error threshold $E_{TH}$ 362: forward the predicted next position to a second finite input response (FIR) filter 356 to refine the predicted next position and produce a refined predicted next position; and advance the user interface 210 to a refined predicted next frame (315) associated with the refined predicted next position.

Figure 4:
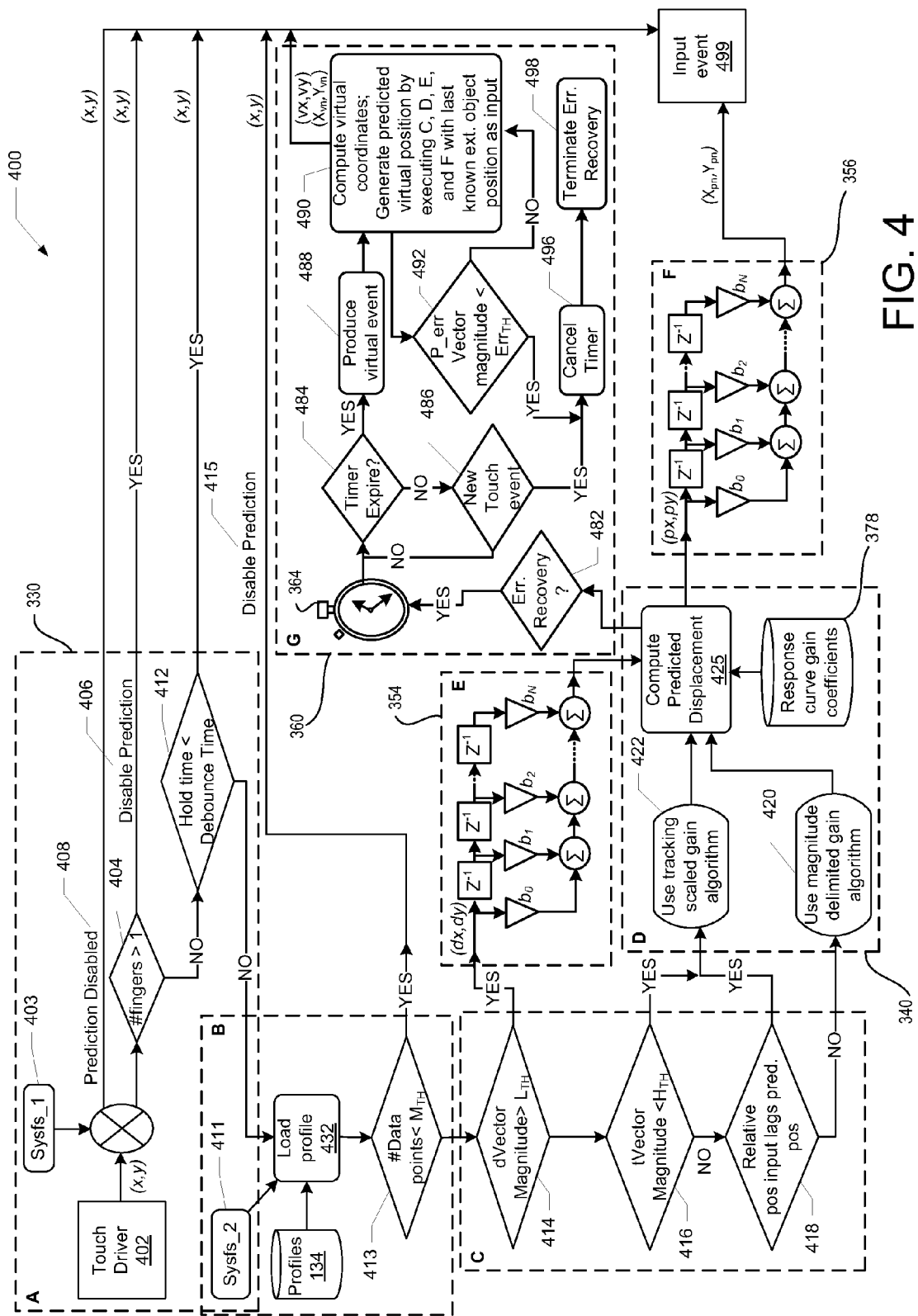
FIG. 4 is a sequence diagram illustrating functional blocks and flow of a predictive touch algorithm, in accordance with one or more embodiments.

FIG. 4 is a sequence diagram 400 and/or the implementation sequence of the predictive touch functionality. FIG. 4 illustrates the above-introduced executing modules with functional blocks and data entries and provides the directional flow of the overall predictive touch processes, in accordance with one or more embodiments. To systematically describe the different modules and the functions they provide, sequence diagram 400 is segmented into blocked segments labeled A-G, with each segment delineated by a dashed exterior box. The segments are generally delineated as follows:
  A. Predictive Touch (PT) Activation
  B. Predictive Touch (PT) profile selection and loading
  C. Displacement Magnitude and Lag Evaluations
  D. Gain Adjustment and Predictive Displacement
  E. Actual Displacement FIR filter
  F. Predicted Displacement FIR filter
  G. Overshoot/Error Recovery Each delineated segment has one or more blocks that represent one or more of data blocks, functional processes, or decision blocks. Several of these blocks have been introduced in the previous description of FIG. 3A, and the corresponding blocks are provided with the same reference numerals as in FIG. 3A. To better understand the processes that occur within each of the blocked segments and the sequence diagram in general, additional description of FIG. 4 is provided with specific reference to the flow charts of FIGS. 5-9, with occasional references to the FIGS. 1-3B, as these other figures become relevant to the particular description of the implementation sequence 400. Following one or more of the various processes that can occur within segments A, B, G and F of FIG. 4, an input event 499 is generated for consumption by applications which output on the device's display. The output is triggered by the particular input trigger received by the frame generating component of the device. Depending on one or more factors detailed herein and the particular branch or segment from which generation of the input event is triggered, the input event 499 that is triggered can be one of (a) the actual next location (x,y) of the external manipulator 165, (b) the predicted next position (px,py), or a virtual predicted next position (vx,vy). In at least one scenario, no valid input is generated, e.g., when multiple objects are detected on the touchpanel and the debounce timer has not expired.

Figure 5:
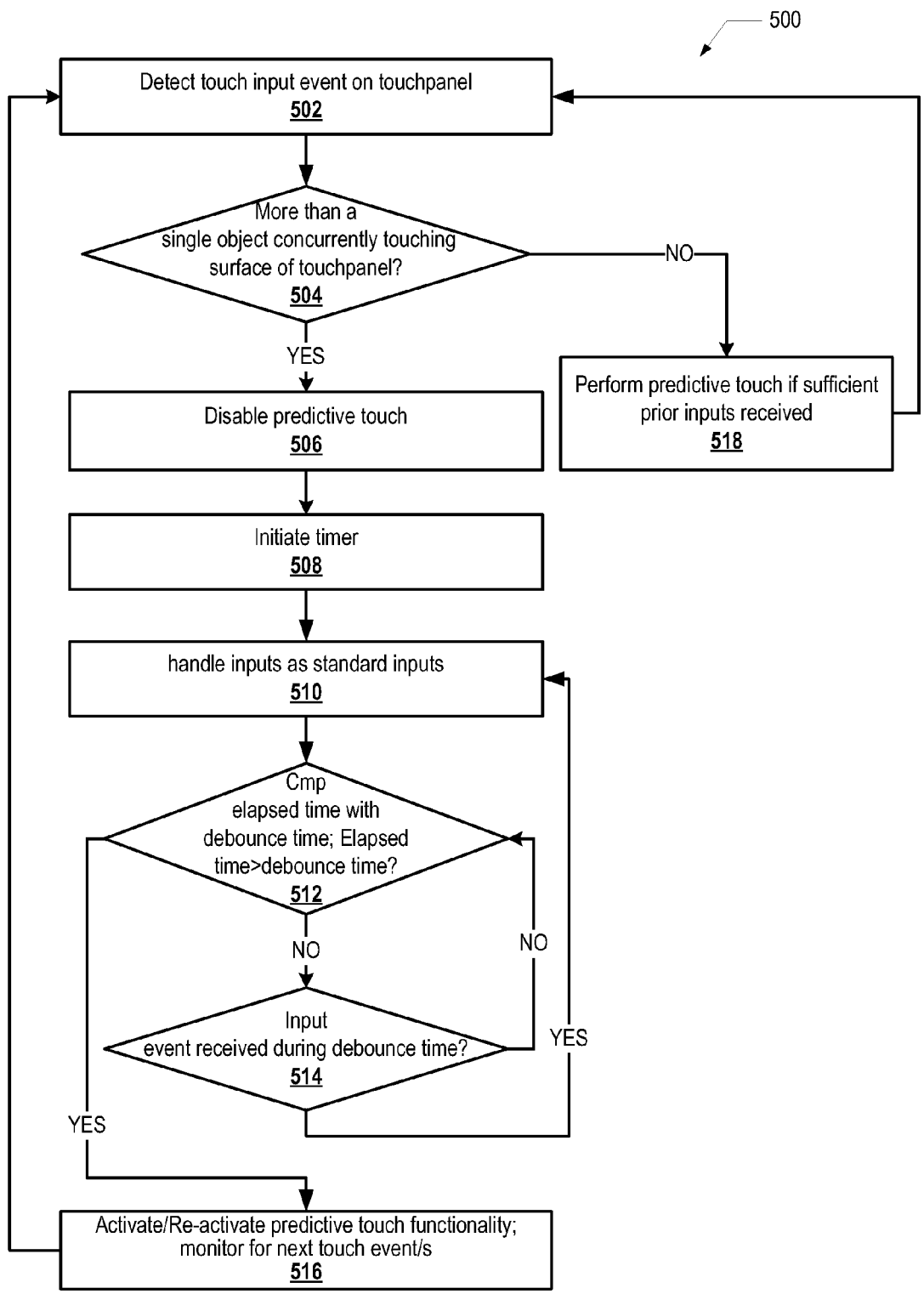
FIG. 5 is a flow chart of a method for implementing predictive touch using a debounce time parameter, in accordance with one embodiment.
Figure 6:
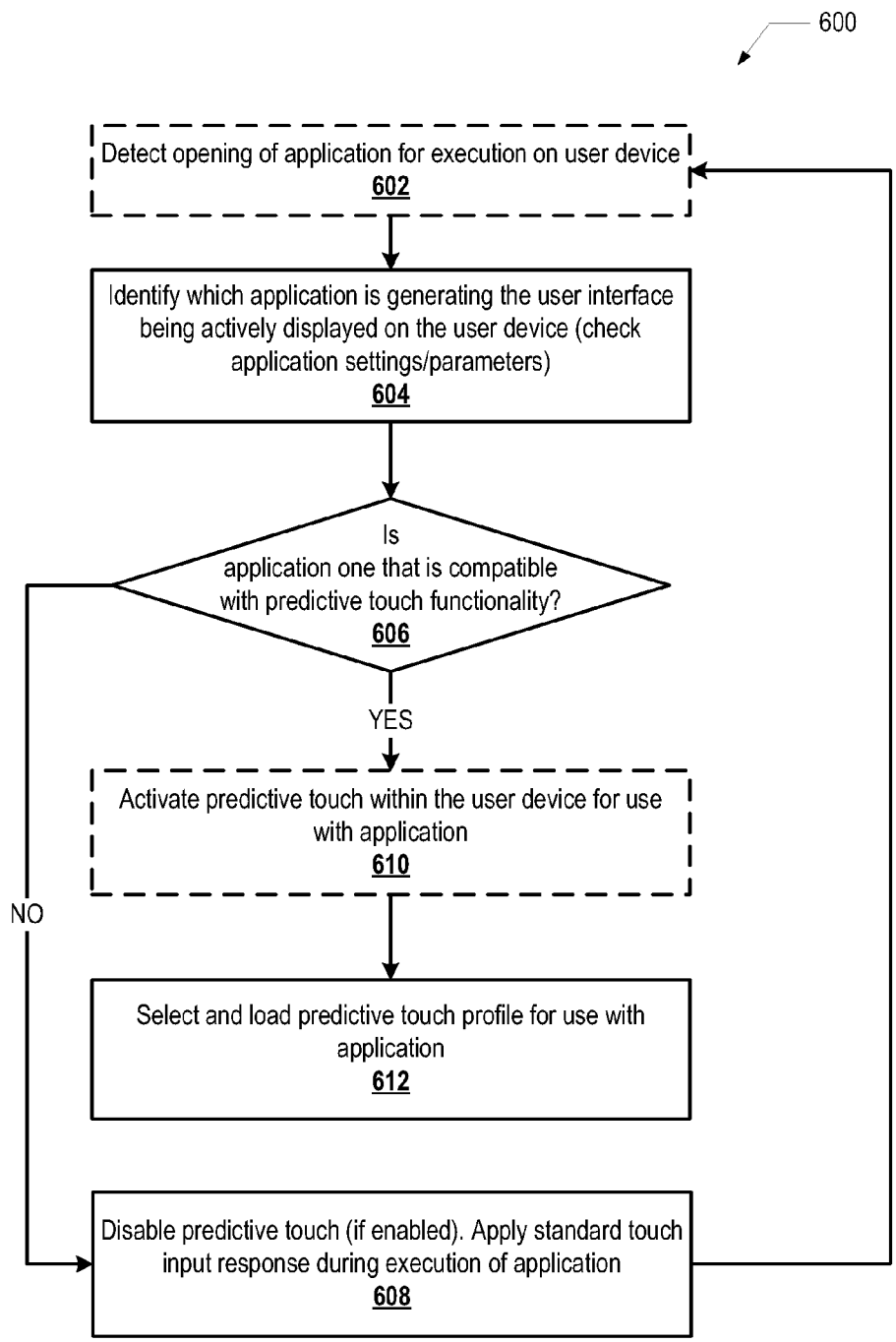
FIG. 6 is a flow chart of a method for initiating and implementing predictive touch within an electronic device, in accordance with one embodiment.
Figure 7:
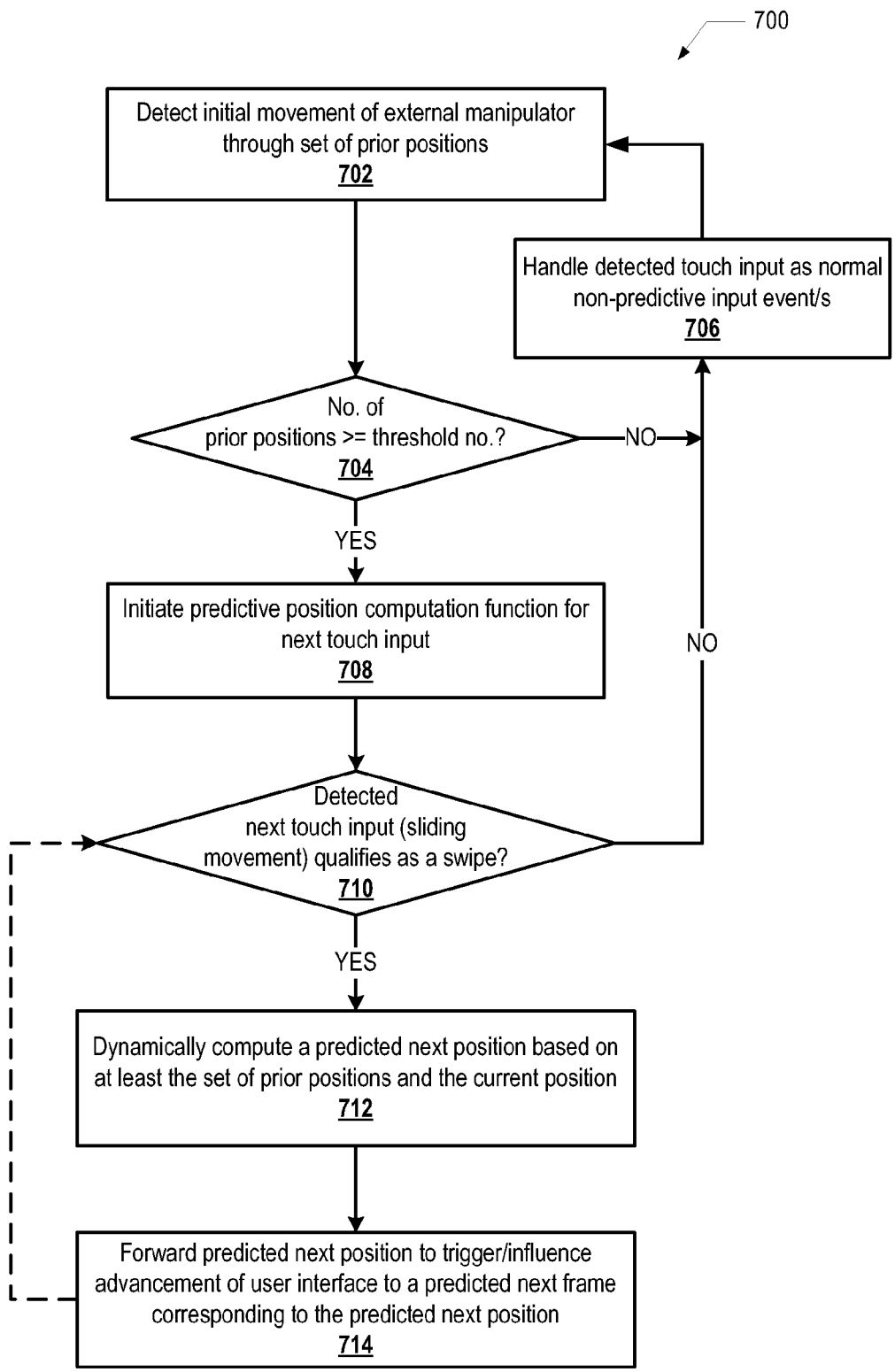
FIG. 7 is a flow chart of a method for activating predictive touch based on receiving a number of prior touch inputs during a continuous touch event, according to one embodiment.
Figure 8:
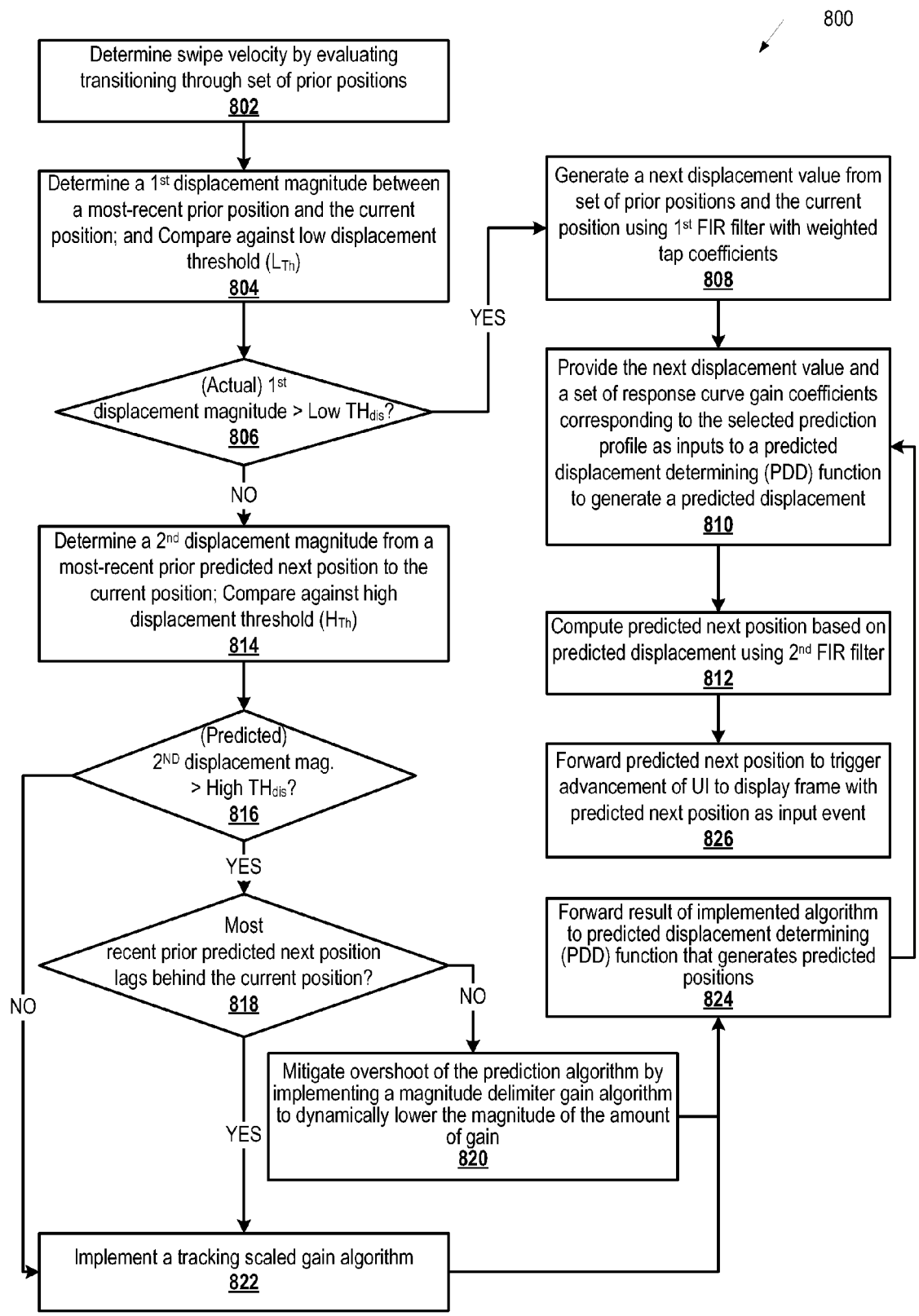
FIG. 8 is a flow chart of a method for evaluating predicted displacements and computing predicted end positions within a predictive touch framework, in accordance with one embodiment.
Figure 9:
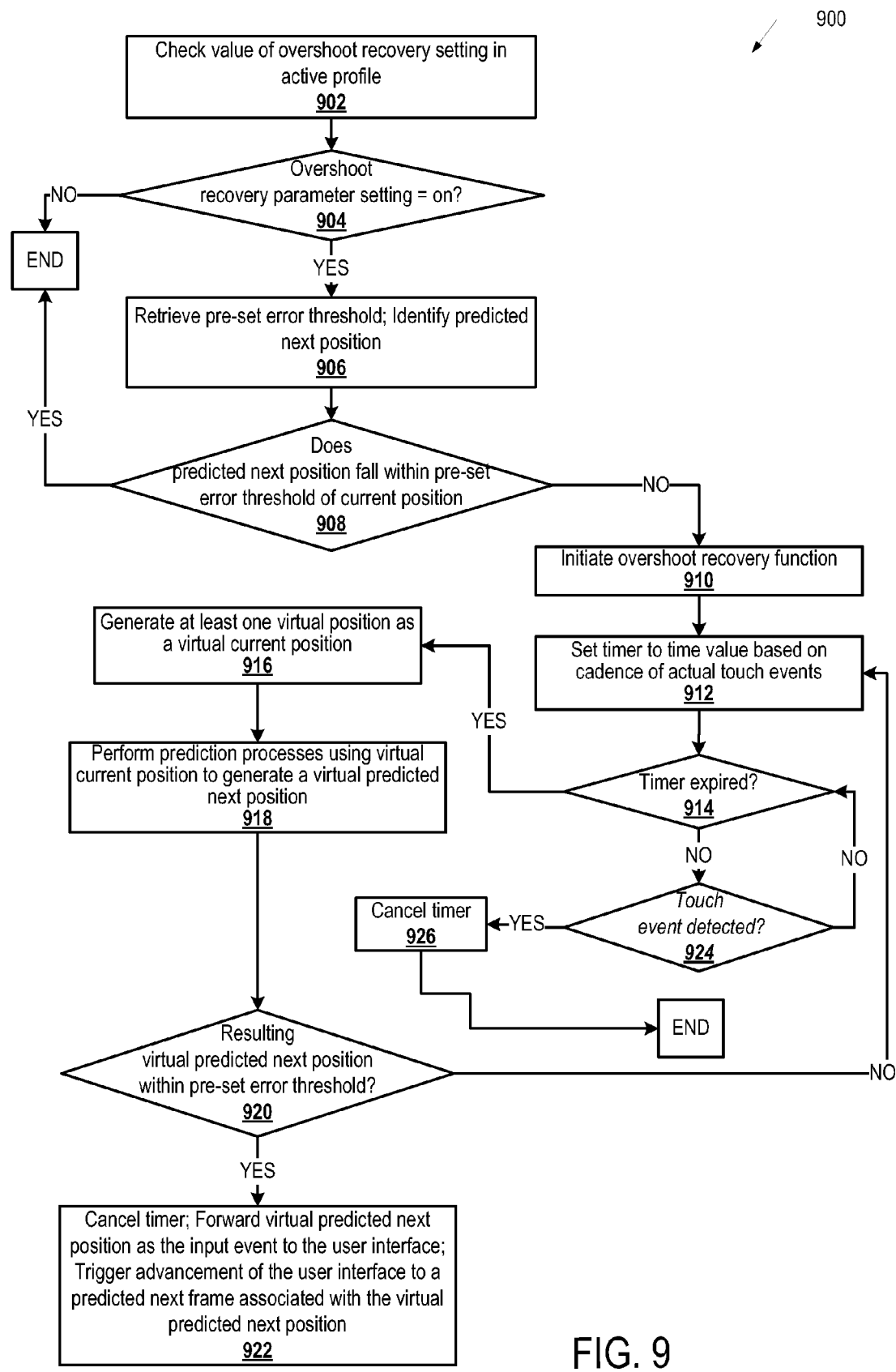
FIG. 9 is a flow chart illustrating a method for initiating error recovery, based on an overshoot or undershoot of a predicted end position relative to an actual end position, in accordance with one embodiment.

Turning now to the flow charts, FIGS. 5-9 present flow charts illustrating various methods (500, 600, 700, 800, and 900), by which the functional processes performed by PT utility 120 and other functional modules within an electronic device 100/200 can be completed, according to a plurality of different embodiments. Specifically, FIGS. 5-7 present various methods 500, 600, 700 by which predictive touch can be triggered or initiated within a user device, including use of a debounce time parameter (FIG. 5) and detection of a number of prior touch inputs (FIG. 7). FIGS. 5-7 involve certain aspects of segments A-F, but focus primarily on the activation steps provided within segments A-B of the implementation sequence 400. FIG. 8 presents method 800 for determining when to implement adjustments to displacement magnitude and velocity based on evaluation of prior inputs and predicted results, involving aspects of Segments C and D. FIG. 8 also provides method 800 for evaluating predicted displacement using a finite impulse response filter (FIR), with tap values derived from a predictive touch profile, to generate the predicted end position, involving aspects of Segments E and F. Finally, FIG. 9 provides method 900 for determining when an error in prediction occurs and initiating error recovery based on an overshoot or undershoot of the predicted end position relative to the actual end position, involving aspects of Segment G.

Each of the described methods involves execution of one or more program modules on processor 105 or other processing component of an electronic device 100/200. The description of the methods 500-900 is therefore presented from the perspective of the module performing the specific processes or the electronic device performing the specific processes. Specifically, the methods include execution of code from PT utility 120 and the other functional modules, such as O/S 114, illustrated within PTEE 300 (FIG. 3) to provide the specific functions described. In each of the flow charts, dashed boxes represent optional components, which can be implemented in some embodiments and not included in other embodiments. Collectively, the methods of the flow charts in FIGS. 5-9 enable predictive touch functionality for application user interfaces displayed on a display or screen and which can be manipulated by and are visually responsive to swipe inputs received on a touch input detection component of the user device.

FIG. 5 illustrates a method 500 by which the predictive touch utility responds to detection of multiple, current external inputs. Method 500 includes detecting (block 502) a touch input event on the touchpanel 148 (FIG. 1). Method 500 includes detecting (404, 504) whether more than a single external object concurrently touches the surface of the touchpanel. This detection is based on information from touch driver 402. In response to detecting (404, 504) concurrent touches by more than a single object, method 500 includes temporarily disabling (406, 506) predictive touch functionality until (i) only a single object is touching the surface, and (ii) at least a pre-set debounce timeout has elapsed following the transition from multiple objects touching the touchpanel 148 to a single object touching the touchpanel 148. Method 500 can also include starting or activating (508) a timer 336. However, in one embodiment, the debounce functionality simply notes the elapsed time between touch events to determine if a preset amount of time (e.g., 300 msec), referred to herein as the debounce time, has passed since detecting multiple objects concurrently touching the touchpanel 148. This time can be determined using an existing kernel time source rather than creating a new timer. Method 500 further includes handling (510) the detected inputs as non-predictive inputs that are forwarded to the output device controller to generate standard (x,y) input events 499.

When only a single external object touches the touchpanel 148, method 500 includes comparing a hold time of the external object 165 on the surface to the pre-set debounce time (e.g., 300 msec) and determining (412, 512) whether the elapsed time since detecting the multiple concurrent inputs (i.e., objects touching the touchpanel) is greater than the pre-set debounce time. When the elapsed time is less than the debounce time, method 500 further monitors (block 514) whether any input events are detected during the debounce period. Any input event detected during the debounce time is handled (block 510) as a standard (i.e., non-predictive) input event. Otherwise, method 500 continues to compare (412, 512) the elapsed time with the debounce time.

When the elapsed time is greater than or equal to the debounce time, method 500 activates/re-activates (block 516) the predictive touch functionality and begins monitoring for the next touch events to the perform predictive touch analysis. Method 500 then returns to block 502. At decision block 504, if the received input detected at the touchpanel 148 is of a single external object, method 500 includes performing (block 518) predictive touch after sufficient prior inputs are received (413).

In one alternate embodiment, the predictive touch utility can include the functionality for discerning among types of inputs in determining whether to enable predictive touch. Thus, for example, the specific embodiment can include identifying when a detected touch input is not a sliding movement (i.e., a swipe) and then temporarily disabling (408) predictive touch functionality. The input is then handled as a non-predictive input that is forwarded to the output device as a normal, single-touch, input event.

Turning to the flow chart of FIG. 6, there is generally presented a method of reducing touch swipe latency within a user interface of a user device. Two optional processes are provided as dashed boxes 602 and 610 in method 600. In one embodiment, these processes can be performed at the user level or application level. As a precursor to the implementation of the automated features of method 600 and as shown in Segment A of implementation sequence 400, the inputs that trigger the below described steps can include a first "sysfs" function call (sysfs_1 403). In one embodiment, the sysfs_1 403 is a kernel entry setting that appears as a virtual file. When the virtual file is read, the file returns the profile number currently in use or a null value (or 0) if predictive touch is disabled. Thus, in order for an application to select a specific profile from among the available profiles 134 (as indicated in Segment B), the application's executable can be programmed to write the number of the specific profile desired to the virtual file. Assuming, for example, that there are 8 different profiles numbered 1 through 8, the application can be programmed to use a specific profile by placing the associated profile number in the virtual file. The application can also be programmed to write the null value (0) into the virtual file to turn off predictive touch.

However, while the above implementation represents one embodiment, for purposes of the description of method 600, these processes, like the others presented in method 600, are performed autonomously within the kernel 114. Method 600 starts at block 602 which includes detecting the opening of an application for execution on the electronic device 100/200. Method 600 includes identifying (block 604) which application is generating the touchscreen user interface that is being displayed on the electronic device 100/200. (See FIG. 2 element 210.) As a part of this process, the PT utility 120 checks the application settings and/or parameter values against those of the supported applications 382. Method 600 then includes determining at decision block 606 whether the application is at least one of: (i) a first-type application whose user interfaces are compatible with the predictive touch function/algorithm; (ii) an application within a pre-established list of applications for which the predictive touch function is pre-assigned; or (iii) an application pre-programmed to instantiate the predictive touch function by modifying one or more parameters of a virtual file within a kernel 114 of the electronic device 100/200.

Then, when the application is not one of the above applications or application types, method 600 includes disabling (408, block 608) the predictive touch functionality and utilizing standard touch input response during execution of the application. In particular, the disabling of the predictive touch functionality is triggered when the application generating the active user interface is a second type application whose user interface is not compatible with the predictive touch functionality. However, when the application is one of the above listed applications or application types that are compatible with the predictive touch functionality, method 600 includes activating (block 610) the predictive touch function within the electronic device for use with the application.

Method 600 includes selecting and loading (432, 612) a predictive touch profile from among multiple available predictive touch profiles 134. As previously introduced, each predictive touch profile is associated with a different response curve that correlates to a series of gains that are applied when dynamically computing the predicted next position. The predictive touch profile also provides various data that are utilized for the various predictive touch computations and evaluations described herein.

Figure 15:
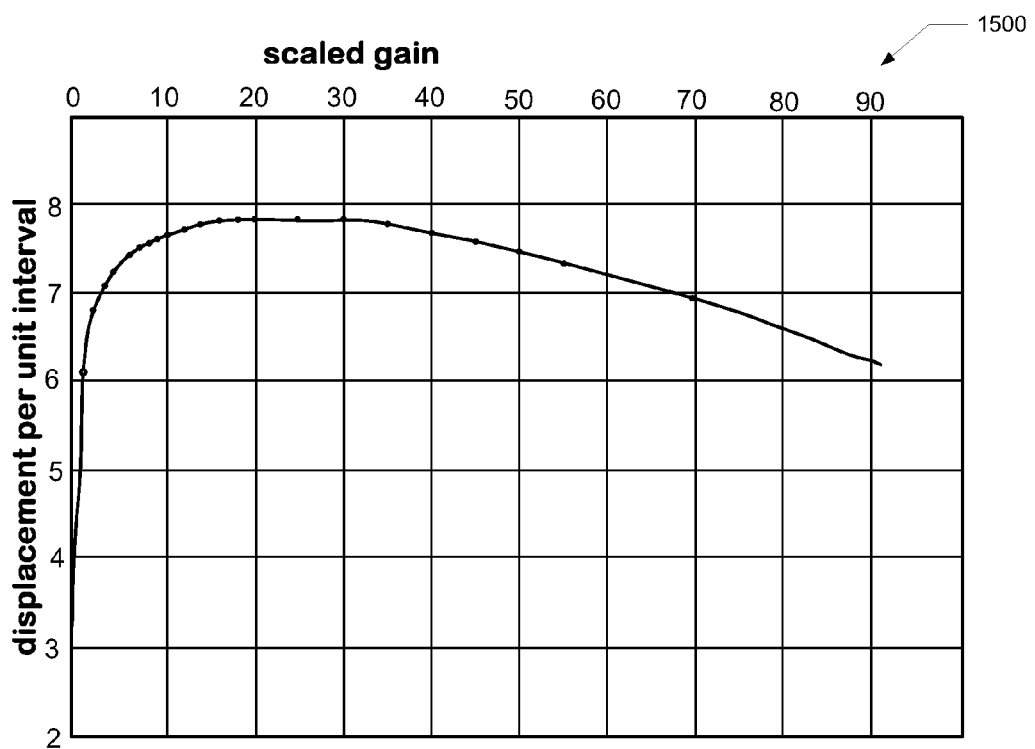
FIGS. 15-16 illustrate two graphs representing two different predictive touch profile curves utilized during execution of a predictive touch algorithm, in accordance with two of several alternate embodiments.
Figure 16:
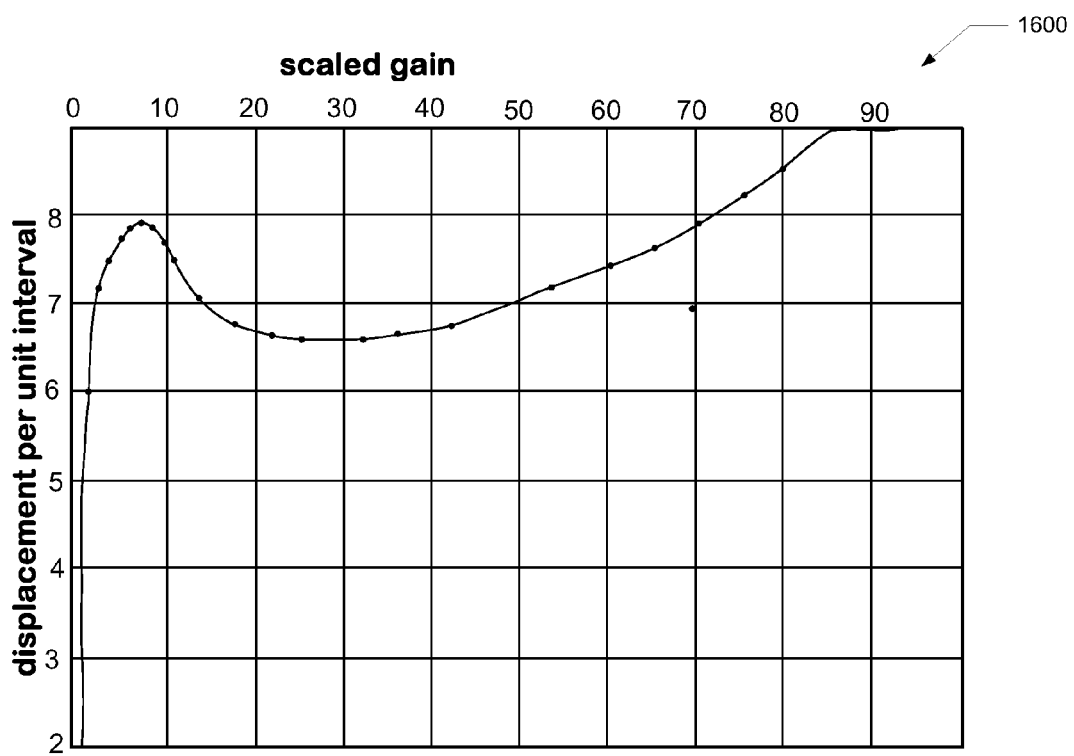

FIGS. 15 and 16 illustrate two examples of prediction response curves, referenced as first curve 1500 and second curve 1600. As shown, each curve has a series of points that represent response curve gains that can be utilized in the computation of the predicted next position. For each curve, the Y axis plots displacement per unit interval, which corresponds to velocity, and the X axis plots the scaled gain. Each axis is plotted using relative values to the other axis, and thus the axes are not provided with specific units of measurement. As illustrated by the curves 1500/1600, the profiles can be significantly different from each other. In one example curve 1500, as the scaled gain increases, the displacement shoots up and then gradually tapers. In another example curve 1600, as the scaled gain increases, the displacement shoots up, dips down, and gradually continues to climb. Further, the number of profiles and the specific ones of the possible profiles that are provided within the implementation of the predictive touch functionality on a particular electronic device is a design choice. Possible profiles can include, without limitation: gradual, aggressive, less, sbear, mbear, scroll, et al., where the example names provided represent a characteristic of the profile or the type of swipe application.

Segment B of FIG. 4 also provides an input of a system function call (sysfs_2 411) as one possible input that triggers or affects the predictive touch profile selection. As introduced above, in one embodiment, the PT features can be (i) triggered by user selection and/or (ii) tailored based on user input/selection of the predictive touch profile. Thus the sysfs_2 411 is programmed into the operating system to allow PT functionality to be enabled on a use case basis from the user space. The user is provided selectable options to enable/disable predictive touch and/or to select a specific profile for use on the electronic device or with a particular application.

Referring now to FIG. 7, with the specific predictive touch profile selected and loaded (432), including the response curves, method 700 includes: detecting and tracking (at block 702) a number n of touch positions; comparing (413, 704) the number n to a threshold number M of prior positions; and when the number of prior positions is not greater than the threshold number of prior positions, disabling prediction (415) and handling (block 706) the detected touch inputs as normal non-predictive input events (499). When the number of touch positions n is greater than the threshold number M of prior positions, method 700 includes initiating (block 708) the predictive touch computation (Segment C) for the next detected touch input of the sliding movement.

According to one embodiment, the set of prior positions includes a threshold number M of prior positions, which number is provided by the loaded predictive touch profile (in 432). Specifically, in order to activate the predictive touch features for a given touch position n, detection of a pre-set minimum number of prior touches ($M_{TH}$) are required. The actual value of $M_{TH}$ is provided as one parameter 332 within the predictive touch profile. As one example, considering a practical implementation in which a total of 120 touch samples can be detected per second, the value of $M_{TH}$ can be as few as 8 touch samples. With this example, all samples are used, including the first 8, with the possible exception of a few samples detected at the very start of a touch swipe event that may be not be recorded due to the touch controller firmware's initial response delay time. The above values utilized within the above description are presented for example only and are not intended to be limiting on the disclosure. The detected touch samples $X_0, Y_0, X_1, Y_1, \ldots, X_n, Y_n$ continue to be used for as long as the touchpanel continuously senses the external manipulator. The final detected touch position, prior to a removal of the external manipulator from the touchpanel, is called $X_N, Y_N$.

Method 700 includes detecting a next touch position of the external manipulator on the touchpanel and determining (block 710) whether the sequence of touch positions indicates a swipe (i.e., performed without removing the manipulator 165 from the touchpanel 148). In response to concluding that a sliding movement (i.e., a swipe) occurred, method 700 dynamically computes (block 712) a predicted next position $X_{pn}, Y_{pn}$ based on the set of M prior positions $X_{n-m}, Y_{n-m}$ where $1 \leq m \leq M$ and the current position $X_n, Y_n$. This occurs before the external manipulator 165 arrives at an end position $X_N, Y_N$ and/or is no longer continuously detected by the touchpanel 148. Details of the computation of block 712 will be described with more detail in conjunction with FIG. 8.

Method 700 then includes forwarding (block 714) the predicted next position to trigger or influence the advancement of the touchscreen user interface to a predicted next graphical frame corresponding to the predicted next position as the input event 499. Method 700 then ends or returns to a previous block such as block 710 to process additional touch positions detected by the external manipulator 165. In one embodiment, method 700 can also transition to method 900 where the external manipulator 165 does not move, but the virtual end position falls outside of an error threshold and error correction can be applied.

Method 800 provides additional details of the processes involved in computing the predicted next position and includes the operations identified in Segments C, D, E, and F of implementation sequence 400. Within Segment C, two vector parameters are defined for use in the evaluation of displacement, namely dVector and tVector. The dVector parameter is based on displacement spanning the previous actual touch event (as recorded by the touch driver 402 of the touchpanel 148) and the current touch event. The tVector parameter is based on the displacement spanning the previous predicted touch event and the current touch event. Thus, while both vectors compute displacement, the dVector parameter represents the result of a computation of the actual displacement of the external manipulator 165 from the last touch event, while the tVector parameter represents a result of the computation of the virtual displacement from the last predicted position to the actual finger location.

Referring to FIG. 8, method 800 includes determining (at block 802) a swipe velocity value by evaluating the transitioning of the external manipulator through the set of M prior positions. Assuming the touch events are sampled at a steady frequency, this velocity value can be determined by the displacement during each period. Method 800 then includes comparing (block 804) a first displacement magnitude between a most-recent prior position, $X_{n-1}, Y_{n-1}$, and the current position $X_n, Y_n$ 240 against a low displacement threshold $L_{TH}$ 348. This comparing can be initiated in response to the number of prior positions n being at least the threshold number M of prior positions, as determined in method 500. The low displacement threshold $L_{TH}$ 348 can be a value retrieved from the predictive touch profile or a pre-set value established for PT utility 120.

At block 806, method 800 includes determining (414, 806) whether the first displacement magnitude |dVector| between the most-recent prior position $X_{n-1}, Y_{n-1}$ and the current position $X_n, Y_n$ 240 is greater than the low displacement threshold $L_{TH}$ 348. Method 800 then includes, in response to the displacement magnitude being greater than the low displacement threshold $L_{TH}$ 348, generating (block 808) a next displacement value from the set of M prior positions and the current position $X_n, Y_n$ 240 using a first finite impulse response (FIR) filter 354 having weighted tap coefficients.

Method 800 further includes providing (at block 810) the next displacement value and a set of response curve gain coefficients corresponding to the selected predictive touch profile as inputs to a predicted displacement determining (PDD) function 425 to generate a predicted displacement pdVector (px,py). Method 800 then includes computing (block 812) the predicted next position ($X_{pn}, Y_{pn}$ 392) of the external manipulator based on the predicted displacement using a second finite impulse response (FIR) filter 356. Following, method 800 includes triggering (block 826) the advancement of the user interface to show the frame corresponding to the predicted next position $X_{pn}, Y_{pn}$ 392 as the input event 499.

Returning to decision block 806, in response to the first displacement magnitude |dVector| not being greater than the low displacement threshold $L_{TH}$ 348, method 800 provides determining (block 814) a second displacement magnitude between a most-recent prior predicted next position $X_{pn-1}, Y_{pn-1}$ and the current position $X_n, Y_n$ 240 and comparing the second displacement magnitude |tVector| against a high displacement threshold $H_{TH}$ 349. In response to determining (416, 816) that the second displacement magnitude |tVector| is greater than the high displacement threshold $H_{TH}$ 349, method 800 includes determining (418, 818) whether the most-recent prior predicted next position $X_{pn-1}, Y_{pn-1}$ lags behind the current position $X_n, Y_n$ 240. Method 800 further includes, when the most-recent prior predicted next position does not lag behind current position: implementing (420, 820) a magnitude delimited gain algorithm 344 which dynamically lowers a magnitude of the amount of gain and mitigates overshoot. The subsequent dynamically computing of the predicted next position then uses a result of the magnitude delimited gain algorithm as an input to the predicted displacement determining (PDD) function 425 to generate (at block 810) a predicted displacement pdVector (px, py) utilized to generate (812) the predicted next position $X_{pn}, Y_{pn}$ 392 using the second FIR filter 356.

Method 800 further includes, in response to one of (a) the second displacement magnitude being less than the high displacement threshold and (b) the most-recent prior predicted next position lagging behind the current position, implementing (422, 822) a tracking scaled gain algorithm 342 to generate a result that is utilized to dynamically compute the predicted next position. Specifically, method 800 includes forwarding (at block 824) the result of the implemented algorithm (342 or 344) as an input to the PDD function 425, which generates the predicted displacement (px, py) that is then forwarded to the second FIR filter 356 to generate (block 812) the predicted next position $X_{pn}, Y_{pn}$ 392.

Method 900 presents the series of processes shown in Segment G performed by PT utility 120 to identify and reduce errors that have occurred in the prediction, such as overshoot errors, among others. The types of errors and specific scenarios in which the error correction feature is triggered includes the following conditions: (i) the predicted end position differs from the last position reported by the touch hardware, the actual end position, (ii) the reported touch events provide almost the same coordinates (i.e., the external manipulator is not moving); and (iii) the external manipulator 165 is still touching the touchpanel 148. When these three conditions are present while the predictive touch profile includes the error recovery feature 370 set to "on", one or more virtual touch events are autonomously generated at roughly a same cadence reported by the touchpanel 148 as the actual touch events received from sensing the external manipulator 165. The value of the x,y coordinates provided to the user interface for presentation thereon is calculated by processing the last position reported by the touchpanel 148, as if a new external touch event was generated at the same coordinates. Thus, the last known actual position of the external manipulator 165 is used to generate a new predicted value, which provides the advantage of extracting data stored in the FIR filters to produce a smooth recovery, rather than a straight line from the last predicted value to the current position of the motionless external manipulator 165. Various aspects of the method 900 are illustrated within Segment G of FIG. 4.

Method 900 starts at block 902 by checking a value of the overshoot recovery parameter 370 for the particular predictive touch profile 134 being utilized and determining ((482, 904) whether the overshoot recovery parameter 370 is set to "on". According to the described embodiments, each predictive touch profile has a corresponding overshoot recovery setting that is set to one of "on" and "off". With the exception of the scroll profile, the profiles are likely designed with their overshoot recovery parameter set to "on" to enable better overall accuracy in their predictions. When the overshoot recovery function 370 is set to off for the active profile, method 900 terminates at end block and no correction of the predicted position is provided.

In response to the selected predictive touch profile having the overshoot recovery parameter set to "on", as determined at decision block 904, method 900 includes retrieving (at block 906) the preset error threshold $E_{TH}$ 362 and identifying the predicted next position $X_{pn}, Y_{pn}$ 392 from the predicted displacement function 425. Method 900 then includes evaluating (block 908) whether a most-recent prior predicted next position falls within the pre-set error threshold $E_{TH}$ 362 of the current position Xn,Yn 240 of the external manipulator 165. When the predicted next position $X_{pn}, Y_{pn}$ 392 falls within the pre-set error threshold $E_{TH}$ 362 of the current position Xn,Yn 240 of the external manipulator 165, no error correction is required and method 900 terminates.

In response to the current position falling outside of the pre-set error threshold $E_{TH}$ 362 at decision block 908, method 900 includes initiating (at block 910) an overshoot recovery function of PT utility 120, which further involves setting (at block 912) an error recovery timer 364 to an established time value. According to one embodiment, the error recovery timer 364 is provided a specifically-determined expiration period based on historical movement data, where the timer 364 is set to expire at the time when the next physical touch event would have occurred or been generated at the touchpanel 148, as if the external manipulator 165 had continued to move across the surface of the touchpanel 148. Thus, the cadence of generated virtual touch position events during the overshoot recovery function is approximately the same as that normally generated on or detected by the touchpanel 148 from continued movement of an external manipulator 165. The generation of the virtual touch position(s) during error recovery is then controlled by the timer expiration period. When the timer 364 is actively counting down the time and the external manipulator 165 is still touching the touchpanel, this scenario implies that the external manipulator 165 has stopped moving and that there might be a difference between the predicted position value and the current actual physical location of the external manipulator 165. The expiration of the timer 364 will trigger the implementation of the processes identified within the right portion of Segment G, which involves generating virtual events.

Method 900 determines (484, 914) when the timer expires. If the timer has not expired at block 914, method 900 includes checking (486, 924) whether a touch event has been detected. When a touch event is detected, method 900 includes canceling (496, 926) the timer, and method 900 then ends with the termination of error recovery 498.

If no touch event occurs before the timer expires, then after the timer expires, method 900 includes generating (488, 916) at least one virtual position (Xv,Yv) as a virtual current position $(X_{vn}, Y_{vn})$ and performing (490, 918) the series of functions in Segments C-F of sequence diagram 400 to compute and/or generate a virtual predicted next position $(X_n, Y_n)$. Method 900 includes comparing (492, 920) the virtual predicted next position $X_{vn}, Y_{vn}$ against the error threshold $E_{TH}$ 362. When the resulting virtual predicted next position $(X_{vn}, Y_{vn})$ is not within the pre-set error threshold, the timer 364 is reset (block 912) to the original time value and a new virtual predictive next position is generated (490). However, if the new virtual position falls within the error threshold $E_{TH}$ 362, the timer 364 is cancelled (492, 922) and no more virtual events are generated. Also, method 900 includes: forwarding (block 922) each virtual predicted next position $(X_{vn}, Y_{vn})$ to be presented as a next input event 499 and triggering the advancement of the user interface to a predicted next frame associated with the virtual predicted next position. It should be noted that while shown as an iterative corrective feature, the error correction process is only implemented if either the timer expires or a touch event is generated by the hardware.

FIGS. 10 and 11 collectively illustrate an example swipe input/action on a touchscreen 205 of electronic user device 200. Specifically, FIG. 10 illustrates a swipe movement by external manipulator 165 from first position $X_0, Y_0$ 227 on touchscreen 205 to second position 240. Also indicated in FIG. 10 is a predicted next position 392, which will be labeled $X_{p25}, Y_{p25}$ for discussion purposes. As illustrated, predicted next position 392 is a bit further than the actual position 240. A next position UI section 1010 of the application user interface is illustrated with dashed lines, within which both the actual position 240 and predicted next position 392 are provided.

FIG. 11 illustrates the difference in the two positions 240 and 392. Notably, since the PT utility 120 is turned on for the application, the predicted end position $X_{p25}, Y_{p25}$ 392 is the position to which the user interface 210 is initially advanced. Thus, from an on-screen visual perspective with a swipe action corresponding to a scrolling of the content within the application user interface 210, content A 225 is moved from first position $X_0, Y_0$ 227 to predicted next position $X_{p25}, Y_{p25}$ 392. Content A 225 has been scrolled downwards to new position $X_{a+p1}, Y_{a+p2}$ where p is a predicted linear change from the original position of the content on touchscreen 205. The dashed outline represents the actual position, $X_{a+d1}, Y_{a+d2}$, at which content A should have been scrolled based on the actual position 240 of the external manipulator 165. Thus, a small delta exists between the actual position $X_{25}, Y_{25}$ 240 and the predicted position $X_{p25}, Y_{p25}$ 392. If the finger is lifted at this point and the touch event stream ends, this delta (p1−d1, p2−d2) represents an overshoot in the prediction, which can be corrected by the overshoot recovery function 370, if that function is set to "on" for the particular predictive touch profile being utilized. It is appreciated that in some instances, depending on the characteristics of the detected motion, there may not be an overshoot in the prediction. For example, use cases where the motion velocity of the external manipulator gradually slows down before the manipulator stops, while remaining on the touchpanel 148, can result in little or no overshoot. Other aspects of electronic device 200 from FIG. 2 have already been described and only the new features are described within the description of FIGS. 10-11, where the predictive position is provided as an end result of the swipe input, in accordance with one or more embodiments.

FIG. 12 illustrates a close up of the next position section 1010 of the user interface in FIGS. 10 and 11. FIGS. 13-14 then illustrate the result of two cycles of error recovery performed by the error recovery features of PT utility 120, as provided for within Segment G of the implementation sequence 400. In each graphic, a predicted end position $X_{p25}$, $Y_{p25}$ is compared to the actual end position 240, relative to an error threshold ($Err_{TH}$) 1205, to determine whether the predicted end position $X_{p25}$, $Y_{p25}$ falls within the acceptable error threshold 1205 Actual next position 240 is at a first location within user interface (UI) frame 1010, while predicted next position 392 is at a second location within UI frame 1010.

Surrounding actual next position 240 is a circular representation of error threshold 1205, which generally represents a maximum distance from actual next position 240 that is acceptable for predicted next position 392 (FIG. 12) to fall within, without triggering the error recovery function. As shown by the use of the circular demarcation, the error threshold 1205, when used to determine whether to perform error recovery, takes into consideration absolute values of distance regardless of the direction, and thus covers both overshoot and undershoot. It is however, appreciated that the determination of whether there is an overshoot versus undershoot scenario is recorded and used within further computation of the next predicted position. The actual value of the error threshold is a design variable that can be different for each predictive touch profile that supports error recovery. As shown by FIG. 12, predicted next position 392 falls outside of the error threshold 1205 for the particular profile represented. This situation would then trigger the error recovery function, which generates a next virtual predicted position.

FIG. 13 provides first updated UI frame 1310. Here, this next virtual predicted position 1325 is shown as being closer to the actual next position 240 but still falls outside the error threshold 1205, thus triggering additional error recovery cycles. The display is updated to reflect the next virtual predicted position 1325 and the error recovery process iterates and updates the display for each iteration until either the error recovery process is terminated by receipt of a new touch input or the virtual predicted position falls within the error threshold 1205. FIG. 14 illustrates that the next virtual predicted position 1425 falls inside of the error threshold 1205, which leads to termination of the error recovery operations and use of the next virtual predicted position 1425 within the next updated UI frame 1410.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described above with reference to flowchart illustrations and/or block diagrams of methods, apparatus (systems) and computer program products according to embodiments of the innovation. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Implementation of the functional features of the disclosure is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general disclosure.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
loading, by an electronic device, a predictive touch profile from a plurality of predictive touch profiles stored on a storage component of the electronic device;
receiving, by an electronic device, an indication of a user input detected by a touch panel, the user input comprising a sliding movement traversing a set of prior locations on the touch panel to a current location on the touch panel
responsive to receiving the indication of the user input:
while the user input is being detected by the touch panel, dynamically determining, by the electronic device, based on the set of prior locations and the current location, and using the predictive touch profile, a predicted next location of the user input on the touch panel, wherein each predictive touch profile from the plurality of predictive touch profiles is associated with a different response curve that correlates to a series of gains that are applied to sliding movements when dynamically determining the predicted next location; and
triggering, by the electronic device, an advancement of a user interface to a predicted next frame corresponding to the predicted next location.

2. The method of claim 1, wherein the set of prior locations includes a threshold number of prior locations.

3. The method of claim 2, further comprising:
determining a swipe velocity value by evaluating the transitioning of the external manipulator through the set of prior locations.

4. The method of claim 1, wherein the activating the predictive touch function comprises:
tracking a number of prior locations represented within the set of prior locations;
determining, by the electronic device, whether the number of prior locations is greater than a threshold number of prior locations; and
responsive to determining that the number of prior locations is greater than the threshold number of prior locations, enabling the predictive touch function for the sliding movement.

5. The method of claim 4, further comprising:
responsive to determining that the number of prior locations is greater than or equal to the threshold number of prior locations, determining, by the electronic device, whether a first displacement magnitude between a most-recent prior location and the current location is greater than a low displacement threshold; and
responsive to determining that the first displacement magnitude is greater than the low displacement threshold:
generating a displacement value from the set of prior locations and the current location using a first finite impulse response filter having weighted tap coefficients;
providing the displacement value and a set of response curve gain coefficients corresponding to a selected predictive touch profile as inputs to a predicted displacement determining function to generate a predicted displacement; and
determining, based on the predicted displacement, the predicted next position of the external manipulator.

6. The method of claim 5, wherein:
responsive to determining that the first displacement magnitude is not greater than the low displacement threshold, determining, by the electronic device, whether a second displacement magnitude between a most-recent prior predicted next position to the current position is greater than a high displacement threshold; and
responsive to determining that the second displacement magnitude is greater than the high displacement threshold:
determining whether the most-recent prior predicted next position lags behind the current position; and
responsive to determining that the most-recent prior predicted next position does not lag behind the current position:
implementing a magnitude delimited gain algorithm which dynamically lowers a magnitude of the amount of gain; and
dynamically determining the predicted next position based on a result of the magnitude delimited gain.

7. The method of claim 6, further comprising:
responsive to determining that either (a) the second displacement magnitude is less than the high displacement threshold or (b) the most-recent prior predicted next position lags behind the current position, implementing a scaled gain algorithm to generate a result that is utilized to dynamically determine the predicted next position.

8. The method of claim 1, further comprising:
receiving, by the electronic device, an indication of a user input to select the predictive touch profile from the plurality of predictive touch profiles, wherein each predictive touch profile from the plurality of predictive touch profiles is associated with a different response curve that correlates to a series of gains that are applied when dynamically determining the predicted next location, wherein the predictive touch profile includes at least one of (1) data values associated with an overshoot recovery parameter, (2) at least one of gain curve scaling value and an offset value, (3) a minimum number of points to evaluate before prediction is done, (4) a first number of finite impulse response taps to use in a first finite impulse response filter of two finite impulse response filters, or (5) a second number of finite impulse response taps to use in a second finite impulse response filter, where the first finite impulse response filter and the second finite impulse response filter are respectively utilized to determine a displacement and a velocity value that are utilized in computing the predicted next location.

9. The method of claim 8, wherein:
each predictive touch profile from the plurality of predictive touch profiles has a corresponding overshoot recovery setting that is set to one of "on" and "off"; and
the method further comprises:
responsive to determining that a selected predictive touch profile has the overshoot recovery setting set to "on":
determining whether the current position falls within a pre-set error threshold of a most-recent prior predicted next position; and
responsive to determining that the current position falls outside of the pre-set error threshold, initiating a recovery function that recursively adds at least one virtual position as a virtual current position until a resulting virtual predicted next position falls within the pre-set error threshold.

10. The method of claim 9, further comprising:
responsive in determining that the current position falls within the pre-set error threshold:
forwarding the predicted next position to a finite input response filter to refine the predicted next position and produce a refined predicted next position; and advancing the user interface to a refined predicted next frame associated with the refined predicted next position.

11. An electronic device comprising:
a storage component that stores a plurality of predictive touch profiles;
a screen that displays at least a first user interface generated using a plurality of image frames;
a touch panel that detects touch inputs from an external manipulator and transmits position data of the touch inputs to a frame rendering component that presents the touch inputs as input events within the first user interface; and
a processor that executes a predictive touch utility to:
load a predictive touch profile from the plurality of predictive touch profiles;
responsive to detecting a sliding movement of the external manipulator from a set of prior locations on a surface of the touch panel to a current location on the surface:
while the touch panel detects the touch inputs form the external manipulator, dynamically determine, based on at least the set of prior locations and the current location, a predicted next location, wherein each predictive touch profile from the plurality of predictive touch profiles is associated with a different response curve that correlates to a series of gains that are applied to sliding movements when dynamically determining the predicted next location; and
advance the first user interface to a predicted next frame corresponding to the predicted next location.

12. The electronic device of claim 11,
wherein the processor further executes an operating system that includes the frame rendering component and an application function call, the frame rendering component outputs, for display by the screen, active frames of the first user interface, and the application function call supports communication of predictive touch results between at least one application user interface and the frame rendering component and communication of application settings for the predictive touch utility, and
wherein the processor further executes an application to generate the first user interface and which interfaces with the operating system via the at least one application user interface.

13. The electronic device of claim 11, wherein the predictive touch utility comprises:
an activation module that determines when to activate predictive touch functionality during execution of an active application by configuring components of the electronic device to:
identify which application is generating the first user interface being displayed on the screen;
trigger activation of the predictive touch functionality in response to determining that the application generating the first user interface is at least one of: (i) a first-type application whose user interface are compatible with a predictive touch algorithm, (ii) an application within a pre-established list of applications for which the predictive touch algorithm is pre-assigned, or (iii) an application pre-programmed to instantiate the predictive touch algorithm by modifying one or more parameters of a virtual file within a kernel of the electronic device; and
disable the predictive touch functionality in response to determining that the application generating the first user interface is a second type application whose user interface is not compatible with the predictive touch algorithm.

14. The electronic device of claim 13, wherein the activation module further configures components of the electronic device to:
detect when more than a single external object concurrently touches the surface; and
responsive to detecting concurrent touches by more than the single external object, disabling predictive touch functionality until (i) only a single object remains touching the surface and (ii) at least a pre-set debounce timeout has elapsed following the disabling of predictive touch functionality due to multiple concurrent touches.

15. The electronic device of claim 13, wherein the activation module configures the processor to:
compare a hold time of the external manipulator on the surface of the touch panel to a pre-set debounce time; and
determine that a touch input is not a sliding movement when the hold time is less than the pre-set debounce time.

16. The electronic device of claim 11, wherein the predictive touch utility comprises a predictive touch algorithm that configures components of the electronic device to:
responsive to determining that a number of prior positions is greater than or equal to the threshold number of prior locations, determine whether a first displacement magnitude between a most-recent prior location and the current location is greater than a low displacement threshold; and
responsive to the first displacement magnitude being greater than the low displacement threshold, the predictive touch utility dynamically computes the predicted next location by configuring components of the electronic device to:
generate a displacement value from the set of prior locations and the current location using a first finite impulse response filter having weighted tap coefficients;
provide the displacement value and a set of response curve gain coefficients corresponding to a selected predictive touch profile as inputs to a predicted displacement determining function to generate a predicted displacement; and
determine, based on the predicted displacement, the predicted next position of the external manipulator.

17. The electronic device of claim 16, wherein the predictive touch utility comprises a gain adjustment module having a tracking scaled gained algorithm and a magnitude delimited gain algorithm and which configures the processor to:
responsive to determining that the first displacement magnitude is not greater than the low displacement threshold, determine whether a second displacement magnitude between a most-recent prior predicted next location to the current location is greater than a high displacement threshold; and
responsive to determining that the second displacement magnitude is greater than the high displacement threshold:
determine whether the most-recent prior predicted next location lags behind the current location; and
responsive to determining that the most-recent prior predicted next location does not lag behind the current location:

implement the magnitude delimited gain algorithm which dynamically lowers a magnitude of the amount of gain; and dynamically determining the predicted next location based on a result of the magnitude delimited gain algorithm to generate the predicted next location.

18. The electronic device of claim 17, wherein the gain adjustment module further configures the processor to:

responsive to determining that either (a) the second displacement magnitude being less than the high displacement threshold or (b) the most-recent prior predicted next location lagging behind the current location, implement a scaled gain algorithm to generate a result that is utilized to dynamically compute the predicted next location.

19. The electronic device of claim 11, wherein:

each predictive touch profile from the plurality of predictive touch profiles is associated with a different response curve that correlates to a series of gains that are applied when dynamically determining the predicted next location, wherein the predictive touch profile includes at least one of (1) data values associated with an overshoot recovery parameter, (2) at least one of gain curve scaling value and an offset value, (3) a minimum number of points to evaluate before prediction is done, (4) a first number of finite impulse response taps to use in a first finite impulse response filter of two finite impulse response filters, or (5) a second number of finite impulse response taps to use in a second finite impulse response filter, where the first finite impulse response filter and the second finite impulse response filter are respectively utilized to determine a displacement and a velocity value that are utilized in computing the predicted next location;

each predictive touch profile from the plurality of predictive touch profiles has a corresponding overshoot recovery setting that is set to one of "on" and "off"; and the predictive touch utility further comprises an error recovery module that configures the processor to:

responsive to determining that a selected predictive touch profile having the overshoot recovery setting set to "on":

determine whether the predicted next position falls within a pre-set error threshold of the current position; and responsive to determining that the current position falls outside of the pre-set error threshold, initiating a recovery function that recursively adds at least one virtual position as a virtual current position until a resulting virtual predicted next position falls within the pre-set error threshold.

20. The electronic device of claim 19, wherein the error recovery module further configures the processor to:

responsive to determining that the current position falling within the pre-set error threshold:

forward the predicted next position to a finite input response filter to refine the predicted next position and produce a refined predicted next position; and trigger an advancement of the user interface to a refined predicted next frame associated with the refined predicted next position.

21. The electronic device of claim 11, wherein the touch panel is one of a touchscreen and a touchpad.

22. The electronic device of claim 11, wherein the predictive touch utility includes a system interface that enables user entry of inputs that sets select features of the predictive touch utility based on a profile setup, including a function call to set a level of responsiveness of the prediction and a second function call to turn off the predictive touch utility.

* * * * *